(12) United States Patent
Qu et al.

(10) Patent No.: US 10,454,630 B2
(45) Date of Patent: Oct. 22, 2019

(54) INFORMATION TRANSMISSION METHOD, AND USER EQUIPMENT AND BASE STATION

(71) Applicant: Huawei Technologies Co., Ltd., Shenzhen (CN)

(72) Inventors: Bingyu Qu, Beijing (CN); Lixia Xue, Beijing (CN); Yan Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/678,287

(22) Filed: Aug. 16, 2017

(65) Prior Publication Data

US 2017/0346604 A1 Nov. 30, 2017

Related U.S. Application Data

(63) Continuation of application No. PCT/CN2015/088039, filed on Aug. 25, 2015.

(30) Foreign Application Priority Data

Feb. 17, 2015 (CN) .......................... 2015 1 0085560

(51) Int. Cl.
  *H04L 1/18* (2006.01)
  *H04W 72/04* (2009.01)
  (Continued)

(52) U.S. Cl.
  CPC .......... *H04L 1/1861* (2013.01); *H04L 1/1854* (2013.01); *H04L 1/1887* (2013.01);
  (Continued)

(58) Field of Classification Search
  CPC combination set(s) only.
  See application file for complete search history.

(56) References Cited

U.S. PATENT DOCUMENTS

2013/0194980 A1\* 8/2013 Yin ....................... H04L 1/1607
                                                                    370/280
2013/0286902 A1  10/2013 Chen et al.
(Continued)

FOREIGN PATENT DOCUMENTS

CN   102263627 A   11/2011
CN   103458513 A   12/2013
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 12)," 3GPP TS 36.211 V12.4.0, Dec. 2014, 124 pages.
(Continued)

*Primary Examiner* — John D Blanton
(74) *Attorney, Agent, or Firm* — Slater Matsil, LLP

(57) ABSTRACT

A user equipment includes a processor and a non-transitory computer-readable storage medium storing a program. The program includes instructions to determine a frame structure of a serving cell. Each frame based on the frame structure comprises 2k subframes having at least: (N−1) downlink subframes, (N−1) uplink subframes, and one special subframe which is a first or second special subframe. N and k are each positive integers greater than or equal to 1. The program has instructions to send and receive information in frames based on the frame structure. Each frame has N downlink subframes, N uplink subframes, and (2k−2N) special subframes, where N is less than k, or N downlink subframes, (N−1) uplink subframes, and one second special subframe, where N is equal to k, or (N−1) downlink subframes, N uplink subframes, and one first special subframe, where N is equal to k.

20 Claims, 7 Drawing Sheets

User equipment determines a frame structure of a serving cell, where each frame based on the frame structure includes 2k subframes, the 2k subframes include at least (N−1) downlink subframes, at least (N−1) uplink subframes, and at least one special subframe, the special subframe is a first special subframe or a second special subframe, N is a positive integer greater than or equal to 1, and k is a positive integer greater than 1; and each frame includes N downlink subframes, N uplink subframes, and (2k−2N) special subframes, and N is less than k; or each frame includes N downlink subframes, (N−1) uplink subframes, and one second special subframe, and N is equal to k; or each frame includes (N−1) downlink subframes, N uplink subframes, and one first special subframe, and N is equal to k  ⟋ 910

The user equipment sends and receives, based on the frame structure, information in the serving cell  ⟋ 920

(51) Int. Cl.
*H04L 5/00* (2006.01)
*H04L 5/14* (2006.01)
(52) U.S. Cl.
CPC .......... *H04L 5/0048* (2013.01); *H04L 5/0053* (2013.01); *H04L 5/1469* (2013.01); *H04W 72/0446* (2013.01)

(56) References Cited

U.S. PATENT DOCUMENTS

| | | |
|---|---|---|
| 2015/0043392 A1 | 2/2015 | Susitaival et al. |
| 2015/0085723 A1 | 3/2015 | Chen et al. |
| 2015/0131494 A1* | 5/2015 | He ................ H04B 7/0469 370/280 |
| 2016/0029239 A1* | 1/2016 | Sadeghi ............ H04W 52/244 370/252 |
| 2016/0227575 A1* | 8/2016 | Furuskog .......... H04W 72/1294 |
| 2017/0279563 A1* | 9/2017 | Seo ....................... H04L 1/1822 |

FOREIGN PATENT DOCUMENTS

| | | |
|---|---|---|
| CN | 103516490 A | 1/2014 |
| EP | 2690815 A2 | 1/2014 |
| EP | 2869628 A1 | 5/2015 |
| KR | 20130127518 A | 11/2013 |
| KR | 20140136923 A | 12/2014 |
| WO | 2014003104 A1 | 1/2014 |

OTHER PUBLICATIONS

Lähetkangas, E. et al., "On the TDD Subframe Structure for Beyond 4G Radio Access Network," Future Network & Mobile Summit 2013 Conference Proceedings, IIMC International Information Management Corporation, 2013, 10 pages.

* cited by examiner

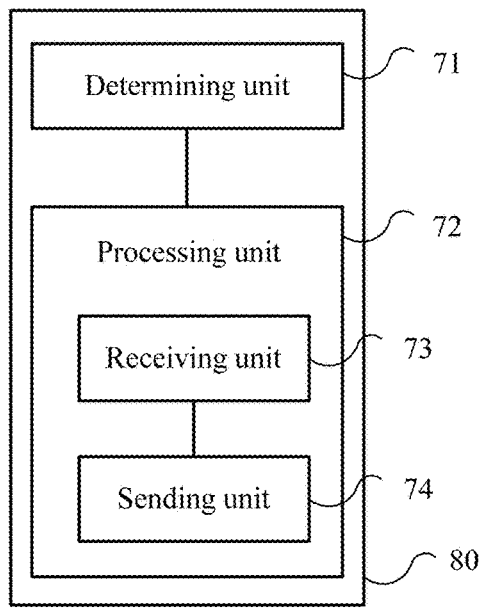

FIG. 8

User equipment determines a frame structure of a serving cell, where each frame based on the frame structure includes 2k subframes, the 2k subframes include at least (N−1) downlink subframes, at least (N−1) uplink subframes, and at least one special subframe, the special subframe is a first special subframe or a second special subframe, N is a positive integer greater than or equal to 1, and k is a positive integer greater than 1; and each frame includes N downlink subframes, N uplink subframes, and (2k−2N) special subframes, and N is less than k; or each frame includes N downlink subframes, (N−1) uplink subframes, and one second special subframe, and N is equal to k; or each frame includes (N−1) downlink subframes, N uplink subframes, and one first special subframe, and N is equal to k — 910

The user equipment sends and receives, based on the frame structure, information in the serving cell — 920

FIG. 9

INFORMATION TRANSMISSION METHOD, AND USER EQUIPMENT AND BASE STATION

CROSS-REFERENCE TO RELATED APPLICATIONS

This application is a continuation of International Application No. PCT/CN2015/088039, filed on Aug. 25, 2015, which claims priority to Chinese Patent Application No. 201510085560.6, filed on Feb. 17, 2015. The disclosures of the aforementioned applications are hereby incorporated by reference in their entireties.

TECHNICAL FIELD

The present invention relates to the field of communications technologies, and more specifically, to an information transmission method, and user equipment and a base station.

BACKGROUND

In a Long Term Evolution (LTE) system, to support a hybrid automatic repeat request (HARQ), user equipment needs to feedback, to a base station by using a physical uplink control channel (PUCCH) or a physical uplink shared channel (PUSCH), a hybrid automatic repeat request-acknowledgment (HARQ-ACK) corresponding to a physical downlink shared channel (PDSCH). The HARQ-ACK may be referred to as an acknowledgement (ACK) or a negative acknowledgement (NACK). The user equipment needs to receive, by using a physical hybrid automatic repeat request indicator channel (PHICH), a HARQ-ACK corresponding to the PUSCH.

An existing LTE system includes two types of frame structures. A first type of frame structure is used for frequency division duplex (FDD), and a second type of frame structure is used for time division duplex (TDD). A length of each subframe in the two types of frame structures is 1 ms.

The frame structure applied to the TDD includes a downlink subframe, an uplink subframe, and a special subframe. There are multiple uplink-downlink configurations in the existing system. For different uplink-downlink configurations, quantities and locations of downlink subframes, uplink subframes, and special subframes in each frame are different. The different uplink-downlink configurations are corresponding to different HARQ timings. The HARQ timings are not unified, so that implementation complexity and standard protocol complexity are relatively high.

SUMMARY

Embodiments of the present invention provide an information transmission method, and user equipment and a base station, to reduce complexity of a HARQ timing.

According to a first aspect, user equipment is provided, including a determining unit, configured to determine a frame structure of a serving cell, where each frame based on the frame structure includes 2k subframes, the 2k subframes include at least (N−1) downlink subframes, at least (N−1) uplink subframes, and at least one special subframe, the special subframe is a first special subframe or a second special subframe, N is a positive integer greater than or equal to 1, and k is a positive integer greater than 1; and a processing unit, configured to send and receive, based on the frame structure, information in the serving cell; where each frame includes N downlink subframes, N uplink subframes, and (2k−2N) special subframes, and N is less than k; or each frame includes N downlink subframes, (N−1) uplink subframes, and one second special subframe, and N is equal to k; or each frame includes (N−1) downlink subframes, N uplink subframes, and one first special subframe, and N is equal to k.

With reference to the first aspect, in a first possible implementation of the first aspect, the special subframe includes a time domain symbol used for downlink transmission, a guard period GP, and a time domain symbol used for uplink transmission; in the first special subframe, a quantity of time domain symbols used for downlink transmission is greater than a quantity of time domain symbols used for uplink transmission; and in the second special subframe, a quantity of time domain symbols used for downlink transmission is less than a quantity of time domain symbols used for uplink transmission.

With reference to the first aspect or the first possible implementation of the first aspect, in a second possible implementation of the first aspect, in the frame structure, if a subframe l is the downlink subframe, a subframe (l+k) is the uplink subframe or the second special subframe, and l is an integer; or if a subframe l is the uplink subframe, a subframe (l+k) is the downlink subframe or the first special subframe, and l is an integer.

With reference to any one of the first aspect, or the first to the second possible implementations of the first aspect, in a third possible implementation of the first aspect, the processing unit is specifically configured to receive, in the serving cell in a subframe (n−k), physical downlink shared channel transmission or a downlink control channel indicating downlink semi-persistent scheduling release, where n is an integer; and send, in a subframe n, a hybrid automatic repeat request-acknowledgment HARQ-ACK response corresponding to the physical downlink shared channel transmission or the downlink control channel in the serving cell in the subframe (n−k).

With reference to any one of the first aspect, or the first to the second possible implementations of the first aspect, in a fourth possible implementation of the first aspect, the processing unit is specifically configured to receive, in a subframe i, a downlink control channel that schedules a physical uplink shared channel; and send, in the serving cell in a subframe (i+k), the physical uplink shared channel scheduled by the downlink control channel, where i is an integer.

With reference to any one of the first aspect, or the first to the second possible implementations of the first aspect, in a fifth possible implementation of the first aspect, the processing unit is specifically configured to send a physical uplink shared channel in the serving cell in a subframe j; and receive, in a subframe (j+k), a HARQ-ACK corresponding to the physical uplink shared channel, where j is an integer.

With reference to any one of the first aspect, or the first to the second possible implementations of the first aspect, in a sixth possible implementation of the first aspect, the processing unit is specifically configured to receive, in a subframe m, a HARQ-ACK corresponding to a physical uplink shared channel, and send, in the serving cell in a subframe (m+k), the physical uplink shared channel corresponding to the HARQ-ACK, where m is an integer.

With reference to any one of the first aspect, or the first to the sixth possible implementations of the first aspect, in a seventh possible implementation of the first aspect, a time domain symbol that is used for uplink transmission and that is in the first special subframe is used to transmit a physical uplink control channel and/or a sounding reference signal SRS.

With reference to any one of the first aspect, or the first to the seventh possible implementations of the first aspect, in an eighth possible implementation of the first aspect, a time domain symbol that is used for downlink transmission and that is in the second special subframe is used to transmit a physical downlink control channel and/or a downlink reference signal.

With reference to any one of the first aspect, or the first to the eighth possible implementations of the first aspect, in a ninth possible implementation of the first aspect, each subframe in the 2k subframes is a subframe of 0.2 ms or a subframe of 0.25 ms.

With reference to any one of the first aspect, or the first to the ninth possible implementations of the first aspect, in a tenth possible implementation of the first aspect, the determining unit is specifically configured to determine the frame structure of the serving cell according to an uplink-downlink configuration of the serving cell, where if the uplink-downlink configuration defines that, in the frame structure, a quantity of subframes used for transmitting the physical uplink shared channel is greater than a quantity of subframes used for transmitting the physical downlink shared channel, the (2k−2N) special subframes are (2k−2N) second special subframes; or if the uplink-downlink configuration defines that, in the frame structure, a quantity of subframes used for transmitting the physical uplink shared channel is less than a quantity of subframes used for transmitting the physical downlink shared channel, the (2k−2N) special subframes are (2k−2N) first special subframes.

According to a second aspect, a base station is provided, including a determining unit, configured to determine a frame structure of a serving cell of user equipment, where each frame based on the frame structure includes 2k subframes, the 2k subframes include at least (N−1) downlink subframes, at least (N−1) uplink subframes, and at least one special subframe, the special subframe is a first special subframe or a second special subframe, N is a positive integer greater than or equal to 1, and k is a positive integer greater than 1; and a processing unit, configured to based on the frame structure, send, in the serving cell, information to the user equipment and receive information from the user equipment; where each frame includes N downlink subframes, N uplink subframes, and (2k−2N) special subframes, and N is less than k; or each frame includes N downlink subframes, (N−1) uplink subframes, and one second special subframe, and N is equal to k; or each frame includes (N−1) downlink subframes, N uplink subframes, and one first special subframe, and N is equal to k.

With reference to the second aspect, in a first possible implementation of the second aspect, the special subframe includes a time domain symbol used for downlink transmission, a guard period GP, and a time domain symbol used for uplink transmission; in the first special subframe, a quantity of time domain symbols used for downlink transmission is greater than a quantity of time domain symbols used for uplink transmission; and in the second special subframe, a quantity of time domain symbols used for downlink transmission is less than a quantity of time domain symbols used for uplink transmission.

With reference to the second aspect or the first possible implementation of the second aspect, in a second possible implementation of the second aspect, in the frame structure, if a subframe l is the downlink subframe, a subframe (l+k) is the uplink subframe or the second special subframe, and l is an integer; or if a subframe l is the uplink subframe, a subframe (l+k) is the downlink subframe or the first special subframe, and l is an integer.

With reference to any one of the second aspect, or the first to the second possible implementations of the second aspect, in a third possible implementation of the second aspect, the processing unit is specifically configured to send, in the serving cell to the user equipment in a subframe (n−k), physical downlink shared channel transmission or a downlink control channel indicating downlink semi-persistent scheduling release, where n is an integer; and receive, in a subframe n, a hybrid automatic repeat request-acknowledgment HARQ-ACK response that is fed back by the user equipment and that is corresponding to the physical downlink shared channel transmission or the downlink control channel in the serving cell in the subframe (n−k).

With reference to any one of the second aspect, or the first to the second possible implementations of the second aspect, in a fourth possible implementation of the second aspect, the processing unit is specifically configured to send, to the user equipment in a subframe i, a downlink control channel that schedules a physical uplink shared channel; and receive, in the serving cell in a subframe (i+k), the physical uplink shared channel scheduled by the downlink control channel, where i is an integer.

With reference to any one of the second aspect, or the first to the second possible implementations of the second aspect, in a fifth possible implementation of the second aspect, the processing unit is specifically configured to receive, in the serving cell in a subframe j, a physical uplink shared channel sent by the user equipment; and send, in a subframe (j+k), a HARQ-ACK corresponding to the physical uplink shared channel, where j is an integer.

With reference to any one of the second aspect, or the first to the second possible implementations of the second aspect, in a sixth possible implementation of the second aspect, the processing unit is specifically configured to send, in a subframe m, a HARQ-ACK that is corresponding to a physical uplink shared channel sent by the user equipment; and receive retransmission of the physical uplink shared channel in the serving cell in a subframe (m+k), where m is an integer.

With reference to any one of the second aspect, or the first to the sixth possible implementations of the second aspect, in a seventh possible implementation of the second aspect, a time domain symbol that is used for uplink transmission and that is in the first special subframe is used to transmit a physical uplink control channel and/or a sounding reference signal SRS.

With reference to any one of the second aspect, or the first to the seventh possible implementations of the second aspect, in an eighth possible implementation of the second aspect, a time domain symbol that is used for downlink transmission and that is in the second special subframe is used to transmit a physical downlink control channel and/or a downlink reference signal.

With reference to any one of the second aspect, or the first to the eighth possible implementations of the second aspect, in a ninth possible implementation of the second aspect, each subframe in the 2k subframes is a subframe of 0.2 ms or a subframe of 0.25 ms.

With reference to any one of the second aspect, or the first to the ninth possible implementations of the second aspect, in a tenth possible implementation of the second aspect, the determining unit is specifically configured to determine the frame structure of the serving cell according to an uplink-downlink configuration of the serving cell, where if the uplink-downlink configuration defines that, in the frame structure, a quantity of subframes used for transmitting the physical uplink shared channel is greater than a quantity of subframes used for transmitting the physical downlink shared channel, the (2k−2N) special subframes are (2k−2N) second special subframes; or if the uplink-downlink configuration defines that, in the frame structure, a quantity of subframes used for transmitting the physical uplink shared channel is less than a quantity of subframes used for transmitting the physical downlink shared channel, the (2k−2N) special subframes are (2k−2N) first special subframes.

According to a third aspect, an information transmission method is provided, including determining, by user equipment, a frame structure of a serving cell, where each frame based on the frame structure includes 2k subframes, the 2k subframes include at least (N−1) downlink subframes, at least (N−1) uplink subframes, and at least one special subframe, the special subframe is a first special subframe or a second special subframe, N is a positive integer greater than or equal to 1, and k is a positive integer greater than 1; and sending and receiving, based on the frame structure by the user equipment, information in the serving cell; where each frame includes N downlink subframes, N uplink subframes, and (2k−2N) special subframes, and N is less than k; or each frame includes N downlink subframes, (N−1) uplink subframes, and one second special subframe, and N is equal to k; or each frame includes (N−1) downlink subframes, N uplink subframes, and one first special subframe, and N is equal to k.

With reference to the third aspect, in a first possible implementation of the third aspect, the special subframe includes a time domain symbol used for downlink transmission, a guard period GP, and a time domain symbol used for uplink transmission; in the first special subframe, a quantity of time domain symbols used for downlink transmission is greater than a quantity of time domain symbols used for uplink transmission; and in the second special subframe, a quantity of time domain symbols used for downlink transmission is less than a quantity of time domain symbols used for uplink transmission.

With reference to the third aspect or the first possible implementation of the third aspect, in a second possible implementation of the third aspect, in the frame structure, if a subframe l is the downlink subframe, a subframe (l+k) is the uplink subframe or the second special subframe, and l is an integer; or if a subframe l is the uplink subframe, a subframe (l+k) is the downlink subframe or the first special subframe, and l is an integer.

With reference to any one of the third aspect, or the first to the second possible implementations of the third aspect, in a third possible implementation of the third aspect, the sending and receiving, based on the frame structure by the user equipment, information in the serving cell includes receiving, in the serving cell by the user equipment in a subframe (n−k), physical downlink shared channel transmission or a downlink control channel indicating downlink semi-persistent scheduling release, where n is an integer; and sending, by the user equipment in a subframe n, a hybrid automatic repeat request-acknowledgment HARQ-ACK response corresponding to the physical downlink shared channel transmission or the downlink control channel in the serving cell in the subframe (n−k).

With reference to any one of the third aspect, or the first to the second possible implementations of the third aspect, in a fourth possible implementation of the third aspect, the sending and receiving, based on the frame structure by the user equipment, information in the serving cell includes receiving, by the user equipment in a subframe i, a downlink control channel that schedules a physical uplink shared channel; and sending, in the serving cell by the user equipment in a subframe (i+k), the physical uplink shared channel scheduled by the downlink control channel, where i is an integer.

With reference to any one of the third aspect, or the first to the second possible implementations of the third aspect, in a fifth possible implementation of the third aspect, the sending and receiving, based on the frame structure by the user equipment, information in the serving cell includes sending, by the user equipment, a physical uplink shared channel in the serving cell in a subframe j; and receiving, by the user equipment in a subframe (j+k), a HARQ-ACK corresponding to the physical uplink shared channel, where j is an integer.

With reference to any one of the third aspect, or the first to the second possible implementations of the third aspect, in a sixth possible implementation of the third aspect, the sending and receiving, based on the frame structure by the user equipment, information in the serving cell includes receiving, by the user equipment in a subframe m, a HARQ-ACK corresponding to a physical uplink shared channel; and sending, in the serving cell by the user equipment in a subframe (m+k), the physical uplink shared channel corresponding to the HARQ-ACK, where m is an integer.

With reference to any one of the third aspect, or the first to the sixth possible implementations of the third aspect, in a seventh possible implementation of the third aspect, a time domain symbol that is used for uplink transmission and that is in the first special subframe is used to transmit a physical uplink control channel and/or a sounding reference signal SRS.

With reference to any one of the third aspect, or the first to the seventh possible implementations of the third aspect, in an eighth possible implementation of the third aspect, a time domain symbol that is used the downlink transmission and that is in the second special subframe is used to transmit a physical downlink control channel and/or a downlink reference signal.

With reference to any one of the third aspect, or the first to the eighth possible implementations of the third aspect, in a ninth possible implementation of the third aspect, each subframe in the 2k subframes is a subframe of 0.2 ms or a subframe of 0.25 ms.

With reference to any one of the third aspect, or the first to the ninth possible implementations of the third aspect, in a tenth possible implementation of the third aspect, the determining, by user equipment, a frame structure of a serving cell includes determining, by the user equipment, the frame structure of the serving cell according to an uplink-downlink configuration of the serving cell, where if the uplink-downlink configuration defines that, in the frame structure, a quantity of subframes used for transmitting the physical uplink shared channel is greater than a quantity of subframes used for transmitting the physical downlink shared channel, the (2k−2N) special subframes are (2k−2N) second special subframes; or if the uplink-downlink configuration defines that, in the frame structure, a quantity of subframes used for transmitting the physical uplink shared channel is less than a quantity of subframes used for transmitting the physical downlink shared channel, the (2k−2N) special subframes are (2k−2N) first special subframes.

According to a fourth aspect, an information transmission method is provided, including determining, by a base station, a frame structure of a serving cell of user equipment, where each frame based on the frame structure includes 2k subframes, the 2k subframes include at least (N−1) downlink subframes, at least (N−1) uplink subframes, and at least one special subframe, the special subframe is a first special subframe or a second special subframe, N is a positive integer greater than or equal to 1, and k is a positive integer greater than 1; and based on the frame structure, sending, in the serving cell by the base station, information to the user equipment and receiving, in the serving cell by the base station, information from the user equipment; where each frame includes N downlink subframes, N uplink subframes, and (2k−2N) special subframes, and N is less than k; or each frame includes N downlink subframes, (N−1) uplink subframes, and one second special subframe, and N is equal to k; or each frame includes (N−1) downlink subframes, N uplink subframes, and one first special subframe, and N is equal to k.

With reference to the fourth aspect, in a first possible implementation of the fourth aspect, the special subframe includes a time domain symbol used for downlink transmission, a guard period GP, and a time domain symbol used for uplink transmission; in the first special subframe, a quantity of time domain symbols used for downlink transmission is greater than a quantity of time domain symbols used for uplink transmission; and in the second special subframe, a quantity of time domain symbols used for downlink transmission is less than a quantity of time domain symbols used for uplink transmission.

With reference to the fourth aspect or the first possible implementation of the fourth aspect, in a second possible implementation of the fourth aspect, in the frame structure, if a subframe l is the downlink subframe, a subframe (l+k) is the uplink subframe or the second special subframe, and l is an integer; or if a subframe l is the uplink subframe, a subframe (l+k) is the downlink subframe or the first special subframe, and l is an integer.

With reference to any one of the fourth aspect, or the first to the second possible implementations of the fourth aspect, in a third possible implementation of the fourth aspect, the sending and receiving, based on the frame structure by the base station, information in the serving cell includes sending, in the serving cell by the base station to the user equipment in a subframe (n−k), physical downlink shared channel transmission or a downlink control channel indicating downlink semi-persistent scheduling release, where n is an integer; and receiving, by the base station in a subframe n, a hybrid automatic repeat request-acknowledgment HARQ-ACK response that is fed back by the user equipment and that is corresponding to the physical downlink shared channel transmission or the downlink control channel in the serving cell in the subframe (n−k).

With reference to any one of the fourth aspect, or the first to the second possible implementations of the fourth aspect, in a fourth possible implementation of the fourth aspect, the sending and receiving, based on the frame structure by the base station, information in the serving cell includes sending, by the base station to the user equipment in a subframe i, a downlink control channel that schedules a physical uplink shared channel; and receiving, in the serving cell by the base station in a subframe (i+k), the physical uplink shared channel scheduled by the downlink control channel, where i is an integer.

With reference to any one of the fourth aspect, or the first to the second possible implementations of the fourth aspect, in a fifth possible implementation of the fourth aspect, the sending and receiving, based on the frame structure by the base station, information in the serving cell includes receiving, in the serving cell by the base station in a subframe j, a physical uplink shared channel sent by the user equipment; and sending, by the base station in a subframe (j+k), a HARQ-ACK corresponding to the physical uplink shared channel, where j is an integer.

With reference to any one of the fourth aspect, or the first to the second possible implementations of the fourth aspect, in a sixth possible implementation of the fourth aspect, the sending and receiving, based on the frame structure by the base station, information in the serving cell includes sending, by the base station in a subframe m, a HARQ-ACK that is corresponding to a physical uplink shared channel sent by the user equipment; and receiving, by the base station, retransmission of the physical uplink shared channel in the serving cell in a subframe (m+k), where m is an integer.

With reference to any one of the fourth aspect, or the first to the sixth possible implementations of the fourth aspect, in a seventh possible implementation of the fourth aspect, a time domain symbol that is used for uplink transmission and that is in the first special subframe is used to transmit a physical uplink control channel and/or a sounding reference signal SRS.

With reference to any one of the fourth aspect, or the first to the seventh possible implementations of the fourth aspect, in an eighth possible implementation of the fourth aspect, a time domain symbol that is used for downlink transmission and that is in the second special subframe is used to transmit a physical downlink control channel and/or a downlink reference signal.

With reference to any one of the fourth aspect, or the first to the eighth possible implementations of the fourth aspect, in a ninth possible implementation of the fourth aspect, each subframe in the 2k subframes is a subframe of 0.2 ms or a subframe of 0.25 ms.

With reference to any one of the fourth aspect, or the first to the ninth possible implementations of the fourth aspect, in a tenth possible implementation of the fourth aspect, the determining, by a base station, a frame structure of a serving cell includes determining, by the base station, the frame structure of the serving cell according to an uplink-downlink configuration of the serving cell, where if the uplink-downlink configuration defines that, in the frame structure, a quantity of subframes used for transmitting the physical uplink shared channel is greater than a quantity of subframes used for transmitting the physical downlink shared channel, the (2k−2N) special subframes are (2k−2N) second special subframes; or if the uplink-downlink configuration defines that, in the frame structure, a quantity of subframes used for transmitting the physical uplink shared channel is less than a quantity of subframes used for transmitting the physical downlink shared channel, the (2k−2N) special subframes are (2k−2N) first special subframes.

In the embodiments of the present invention, a downlink subframe, an uplink subframe, and a special subframe are introduced in a radio frame, and a frame structure of a serving cell is determined. Information is sent and received based on the frame structure, so that an uplink HARQ timing and a downlink HARQ timing remain unchanged and are equal to each other for different uplink-downlink configurations. Therefore, in the embodiments of the present invention, a unified HARQ timing is used, so that complexity of a HARQ timing is reduced. Specifically, in the embodiments of the present invention, not only a unified HARQ-ACK timing but also a unified HARQ retransmission or scheduling timing can be ensured.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 8 is a schematic block diagram of a base station according to another embodiment of the present invention;

FIG. 9 is a schematic flowchart of an information transmission method according to an embodiment of the present invention;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that the embodiments of the present invention may be applied to an LTE system, an LTE evolved system, a single-carrier system, or a multi-carrier system.

User equipment (UE for short, User Equipment), also referred to as a mobile terminal (MT for short, Mobile Terminal), mobile user equipment, and the like, may communicate with one or more core networks by using a radio access network (for example, RAN for short, Radio Access Network). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus.

A base station may be a base station (BTS for short, Base Transceiver Station) in the GSM or CDMA, or may be a base station (NodeB) in the WCDMA, or may be an evolved NodeB (eNB or e-NodeB, evolved Node B) in the LTE, which is not limited in the present invention.

In a future evolved LTE system, to reduce a service delay, a length of each subframe is shortened. For example, the length of each subframe is shortened to 0.2 ms or 0.25 ms. A subframe shortened in terms of time may be referred to as a short subframe or an ultra short subframe, or may be referred to as a short transmission timing interval (Transmission Time Interval, TTI) or an ultra short TTI.

Figure 1:
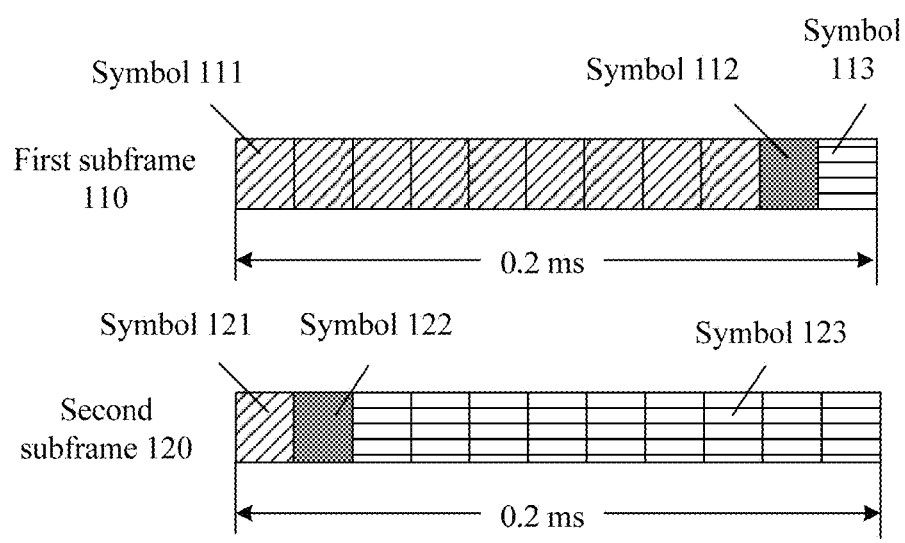
FIG. 1 is a schematic block diagram of a subframe structure.

The following describes a subframe structure of a short subframe in detail with reference to FIG. 1.

FIG. 1 is a schematic block diagram of a subframe structure. As shown in FIG. 1, FIG. 1 is a short subframe of 0.2 ms. One short subframe may include 11 symbols in a time domain. The symbols may be single carrier frequency division multiple access (Single-Carrier Frequency Division Multiple Access, SC-FDMA) symbols.

FIG. 1 includes a first subframe no and a second subframe 120. The first subframe 110 is mainly used for downlink transmission, and the second subframe 120 is mainly used for uplink transmission. Among 11 symbols in the first subframe 110, nine symbols 111 are used for downlink transmission, one symbol 112 is used in a guard period (Guard Period, GP), and one symbol 113 is used for uplink transmission. Among 11 symbols in the second subframe 120, one symbol 121 is used for downlink transmission, one symbol 122 is used in the GP, and nine symbols 123 are used for uplink transmission.

One frame may merely include a first subframe 110 and a second subframe 120. Quantities and distributions of first subframes no and second subframes 120 in the frame may be determined according to an uplink-downlink configuration. For example, when the uplink-downlink configuration is 1:4, the first four subframes are first subframes no, and the last subframe is a second subframe 120; when the uplink-downlink configuration is 0.5, five subframes are all first subframes 110; when the uplink-downlink configuration is 4:1, a subframe arranged in the first place is a first subframe 110, and four remaining subframes are second subframes 120; or when the uplink-downlink configuration is 1:1, subframes arranged in the first, third, and fifth places are first subframes no, and subframes arranged in the second and fourth places are second subframes 120.

In several frame structures in the foregoing example, both the first subframe 110 and the second subframe 120 can transmit a physical uplink control channel and a physical downlink control channel. Therefore, frame structures formed according to different uplink-downlink configurations may use a unified HARQ-ACK timing. For example, an uplink HARQ-ACK timing may be that the User equipment receives, in a subframe (N−3), physical downlink shared channel PDSCH transmission or a downlink control channel indicating downlink semi-persistent scheduling (Semi-Persisting Scheduling, SPS) release, and feeds back, in a subframe n, a HARQ-ACK of the PDSCH transmission or a HARQ-ACK of the downlink control channel indicating the downlink semi-persistent scheduling SPS release.

In the frame structure, a unified HARQ-ACK timing is provided for different uplink-downlink configurations. However, each subframe in the frame structure includes a GP, so that overheads are relatively high.

In addition, the frame structure may not be able to ensure a HARQ retransmission timing. For example, an (n+3) subframe needs to be a first subframe type if downlink retransmission needs to be performed on the (n+3) subframe.

Figure 2:
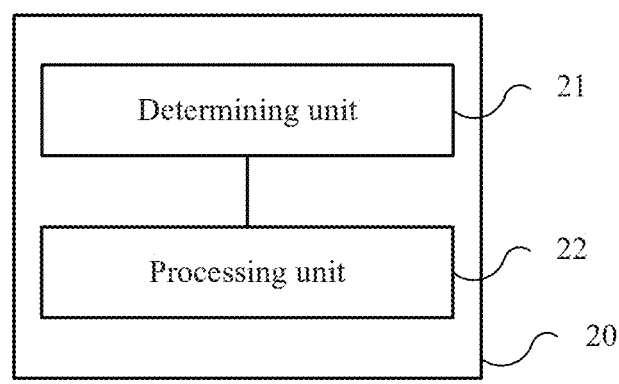
FIG. 2 is a schematic block diagram of user equipment according to an embodiment of the present invention.

FIG. 2 is a schematic block diagram of user equipment according to an embodiment of the present invention. The user equipment in FIG. 2 may implement a method shown in FIG. 9. The user equipment 20 may include a determining unit 21 and a processing unit 22.

The determining unit 21 determines a frame structure of a serving cell, where each frame based on the frame structure includes 2k subframes, the 2k subframes include at least (N−1) downlink subframes, at least (N−1) uplink subframes, and at least one special subframe, the special subframe is a first special subframe or a second special subframe, N is a positive integer greater than or equal to 1, and k is a positive integer greater than 1; and each frame includes N downlink subframes, N uplink subframes, and (2k−2N) special subframes, and N is less than k; or each frame includes N downlink subframes, (N−1) uplink subframes, and one second special subframe, and N is equal to k; or each frame includes (N−1) downlink subframes, N uplink subframes, and one first special subframe, and N is equal to k.

The processing unit 22 sends and receives, based on the frame structure, information in the serving cell.

In this embodiment of the present invention, a downlink subframe, an uplink subframe, and a special subframe are introduced in a radio frame, and a frame structure of a serving cell is determined. Information is sent and received based on the frame structure, so that an uplink HARQ timing and a downlink HARQ timing remain unchanged and are equal to each other for different uplink-downlink configurations. Therefore, in this embodiment of the present invention, a unified hybrid automatic retransmission timing is used, so that complexity of a HARQ timing is reduced. Specifically, in this embodiment of the present invention, not only a unified HARQ-ACK timing but also a unified HARQ retransmission or scheduling timing can be ensured.

It should be understood that the serving cell in this embodiment of the present invention may be a serving cell configured by a network side device for the user equipment, a serving cell that serves the user equipment, or a serving cell that the user equipment accesses. The serving cell (serving cell) in this embodiment of the present invention may also be referred to as a component carrier (component carrier). The serving cell in this embodiment of the present invention may be a primary serving cell (Primary serving cell) of the user equipment, or may be a secondary serving cell (Secondary serving cell) of the user equipment.

It should be further understood that, in this embodiment of the present invention, only 2k subframes are described in this embodiment. Optionally, a quantity of subframes in this embodiment of the present invention may further be a multiple of 2k, for example, 4k or 8k.

It should be further understood that, in this embodiment of the present invention, a method for determining the frame structure of the serving cell by the determining unit 21 is not limited, provided that a determined frame structure meets a requirement. For example, in this embodiment of the present invention, a rule that may be followed by a determining method described in FIG. 5 may be used. To avoid repetition, details are not described herein. In this embodiment of the present invention, a special subframe shown in FIG. 1 or FIG. 4 may be used. The frame structure determined in this embodiment of the present invention may be a frame structure shown in FIG. 5 and FIG. 6.

Optionally, in another embodiment, the determining unit 21 may determine the frame structure of the serving cell according to an uplink-downlink configuration of the serving cell. Different uplink-downlink configurations are corresponding to different frame structures, and frames corresponding to the different frame structures are formed differently.

The frames corresponding to the different frame structures may have the following commonality. One frame includes 2k subframes that include at least (N−1) downlink subframes, at least (N−1) uplink subframes, and at least one special subframe, where k is a positive integer greater than 1, and N is a positive integer greater than or equal to 1.

Optionally, in another embodiment, the special subframe may include a time domain symbol used for downlink transmission, a guard period GP, and a time domain symbol used for uplink transmission; in the first special subframe, a quantity of time domain symbols used for downlink transmission is greater than a quantity of time domain symbols used for uplink transmission; and in the second special subframe, a quantity of time domain symbols used for downlink transmission is less than a quantity of time domain symbols used for uplink transmission.

The downlink subframe may merely include a time domain symbol used for downlink transmission. The uplink subframe may merely include a time domain symbol used for uplink transmission. A subframe type of a special subframe may be a first special subframe mainly used for downlink transmission or a second special subframe mainly used for uplink transmission. The first special subframe may include a time domain symbol used for downlink transmission, a guard period GP, and a time domain symbol used for uplink transmission, and a quantity of time domain symbols used for downlink transmission is greater than a quantity of time domain symbols used for uplink transmission. The second special subframe may include a time domain symbol used for downlink transmission, a guard period GP, and a time domain symbol used for uplink transmission, and a quantity of time domain symbols used for downlink transmission is less than a quantity of time domain symbols used for uplink transmission.

Optionally, in another embodiment, the first special subframe may be the first subframe 110 in FIG. 1, and the second special subframe may be the second subframe 120 in FIG. 1.

Figure 4:
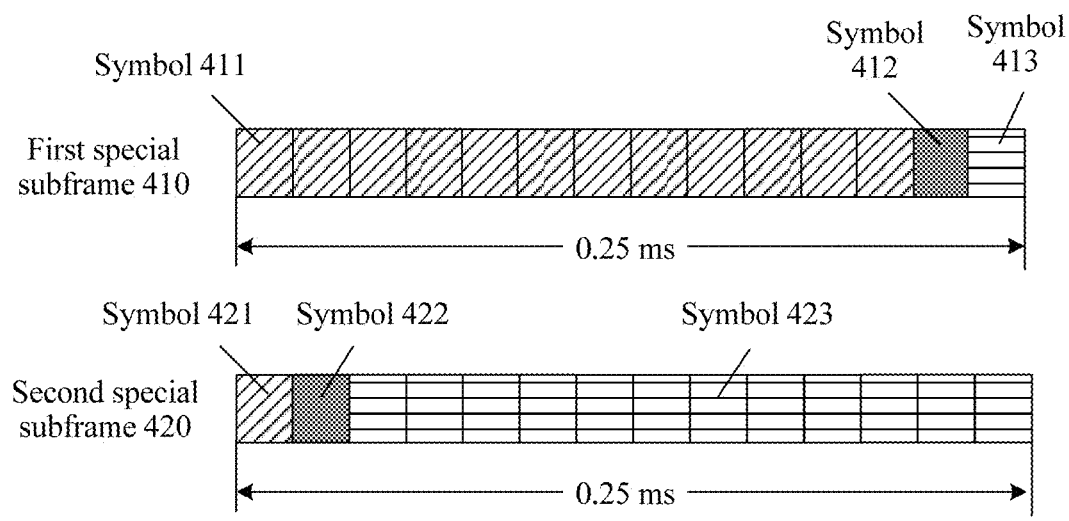
FIG. 4 is a schematic structural block diagram of a special subframe according to an embodiment of the present invention.

Optionally, in another embodiment, the first special subframe and the second special subframe in this embodiment of the present invention may be respectively a first special subframe 410 and a second special subframe 420 in FIG. 4.

Optionally, in another embodiment, the determining unit 21 may determine the frame structure of the serving cell according to an uplink-downlink configuration of the serving cell, where if the uplink-downlink configuration defines that, in the frame structure, a quantity of subframes used for transmitting a physical uplink shared channel is greater than a quantity of subframes used for transmitting a physical downlink shared channel, the (2k−2N) special subframes are (2k−2N) second special subframes; or if the uplink-downlink configuration defines that, in the frame structure, a quantity of subframes used for transmitting a physical uplink shared channel is less than a quantity of subframes used for transmitting a physical downlink shared channel, the (2k−2N) special subframes are (2k−2N) first special subframes.

In other words, if the uplink-downlink configuration defines that, in the frame structure, the quantity of subframes used for transmitting the physical uplink shared channel is greater than the quantity of subframes used for transmitting the physical downlink shared channel, each subframe includes N downlink subframes, N uplink subframes, and (2k−2N) second special subframes, and N is less than k; or if the uplink-downlink configuration defines that, in the frame structure, the quantity of subframes used for transmitting the physical uplink shared channel is less than the quantity of subframes used for transmitting the physical downlink shared channel, each subframe includes N downlink subframes, N uplink subframes, and (2k−2N) first special subframes. Further, in this embodiment of the present invention, locations of a downlink subframe, an uplink subframe, and a special subframe in one frame may be determined in the following manner. N downlink subframes are first arranged in the front of the frame; and if it is assumed that the N downlink subframes are corresponding to a subframe l in the frame, where l=0, 1, 2, . . . , (N−1), a subframe (l+k) in the frame is an uplink subframe, and remaining subframes are special subframes.

Optionally, in another embodiment, the frame structure in this embodiment of the present invention may meet the following feature. If a subframe l is a downlink subframe, a subframe (l+k) is an uplink subframe or a second special subframe, and l is an integer; or if a subframe l is an uplink subframe, a subframe (l+k) is a downlink subframe or a first special subframe, and l is an integer.

Optionally, in another embodiment, one frame may include N downlink subframes, (N−1) uplink subframes, and one second special subframe; or one frame may include (N−1) downlink subframes, N uplink subframes, and one first special subframe. Further, in this embodiment of the present invention, locations of a downlink subframe, an uplink subframe, and a special subframe in one frame may be determined in the following manner. The downlink subframe is arranged at the first subframe location in the frame, the uplink subframe is arranged at the last subframe location in the frame, and the special subframe is arranged between the first subframe location and the last subframe location.

Optionally, in another embodiment, a time domain symbol that may be used for uplink transmission and that is in the first special subframe is used to transmit a physical uplink control channel and/or a sounding reference signal SRS.

Optionally, in another embodiment, a time domain symbol that is used for downlink transmission and that is in the second special subframe is used to transmit a physical downlink control channel and/or a downlink reference signal.

Optionally, in another embodiment, each subframe in the 2k subframes is a subframe of 0.2 ms or a subframe of 0.25 ms. That is, a length of each subframe in the 2k subframes may be 0.2 ms or 0.25 ms.

It should be understood that, in this embodiment of the present invention, a value of k, an uplink-downlink configuration, and a length of each subframe are not limited. Optionally, in an embodiment, when the length of each subframe is 0.2 ms, the value of k may be 3. Optionally, in another embodiment, when the length of each subframe is 0.25 ms, the value of k may be 2. When the length of each subframe is 1 ms, the value of k may be 4.

In this embodiment of the present invention, a downlink subframe, an uplink subframe, and a special subframe are introduced in a radio frame, and a frame structure of a serving cell is determined. Information is sent and received based on the frame structure, so that an uplink HARQ timing and a downlink HARQ timing remain unchanged and are equal to each other for different uplink-downlink configurations. Therefore, in this embodiment of the present invention, a unified hybrid automatic retransmission timing is used, so that complexity of a HARQ timing is reduced. Specifically, in this embodiment of the present invention, not only a unified HARQ-ACK timing but also a unified HARQ retransmission or scheduling timing can be ensured.

In addition, in this embodiment of the present invention, the downlink subframe, the uplink subframe, and the special subframe are introduced, so that not each subframe in a frame includes a GP. In this way, not only one hybrid automatic retransmission timing is used but also overheads of a CP and a GP are reduced.

Optionally, in another embodiment, the user equipment may obtain an uplink-downlink configuration index and an uplink-downlink configuration table of the serving cell. The frame structure of the serving cell is determined according to a configured uplink-downlink configuration index and a configured uplink-downlink configuration table.

The following is described in detail with reference to Table 1 and Table 2. Table 1 may be corresponding to subframes shown in FIG. 1, and Table 2 may be corresponding to subframes corresponding to FIG. 4. Table 1 is an uplink-downlink configuration (k=3) that is of the serving cell and that is for a short subframe structure.

TABLE 1

Uplink-downlink configuration (k = 3) that is of the serving cell and that is for a short subframe structure

| Uplink-downlink configuration | Quantity of subframes | | | | | |
|---|---|---|---|---|---|---|
| index | 0 | 1 | 2 | 3 | 4 | 5 |
| a | D | S1 | S1 | U | S1 | S1 |
| b | D | D | S1 | U | U | S1 |
| c | S1 | S1 | S1 | S1 | S1 | S1 |
| d | D | D | S2 | U | U | S2 |
| e | D | S2 | S2 | U | S2 | S2 |
| f | D | D | D | S2 | U | U |
| g | S2 | S2 | S2 | S2 | S2 | S2 |

D is a downlink subframe, U is an uplink subframe, S1 is a first special subframe, and S2 is a second special subframe. In addition, a, b, c, d, e, f, and g may respectively represent uplink-downlink configurations: 1:5, 2:4, 0:6, 4:2, 5:1, 3:3, and 6:0. Optionally, a sequence of configuration relationships represented by a, b, c, d, e, f, and g may also be changed. This is not limited in this embodiment of the present invention.

TABLE 2

Uplink-downlink configuration (k = 2) that is of the serving cell and that is for a short subframe structure

| Uplink-downlink configuration | Quantity of subframes | | | |
|---|---|---|---|---|
| | 0 | 1 | 2 | 3 |
| h | D | D | S2 | U |
| i | D | S1 | U | S1 |
| j | D | S2 | U | S2 |
| k | S1 | S1 | S1 | S1 |
| l | S2 | S2 | S2 | S2 |

D is a downlink subframe, U is an uplink subframe, S1 is a first special subframe, and S2 is a second special subframe. In addition, h, i, j, k, and 1 may respectively represent uplink-downlink configurations: 2:2, 1:3, 3:1, 0:4, and 4:0. Optionally, a sequence of configuration relationships represented by a, b, c, d, e, f, and g may also be changed. This is not limited in this embodiment of the present invention.

According to the frame structure in this embodiment of the present invention, an uplink subframe and a downlink subframe are introduced in one frame. Therefore, overheads caused by a CP and a GP are reduced. In an example of the frame structure based on Table 1, overheads of a CP and a GP may be shown in Table 3. In an example of the frame structure based on Table 2, overheads of a CP and a GP may be shown in Table 4.

TABLE 3

Overheads (k = 3) of a CP and a
GP for a short subframe (0.2 ms) structure

| Uplink-downlink configuration | Overheads of a CP and a GP |
|---|---|
| 1:5 | 13.89% |
| 2:4 | 11.11% |
| 0:6 | 16.67% |
| 4:2 | 11.11% |
| 5:1 | 13.89% |
| 3:3 | 9.72% |
| 6:0 | 16.67% |

TABLE 4

Overheads (k = 2) of a CP and a
GP for a short subframe (0.25 ms) structure

| Uplink-downlink configuration | Overheads of a CP and a GP |
|---|---|
| 1:3 | 10% |
| 3:1 | 10% |
| 2:2 | 8.33% |
| 0:4 | 13.33% |
| 4:0 | 13.33% |

Therefore, it may be learned from Table 3 and Table 4 that overheads of a CP and a GP may be reduced in the frame structure in this embodiment of the present invention in comparison with the frame structure shown in FIG. 1.

Figure 3:
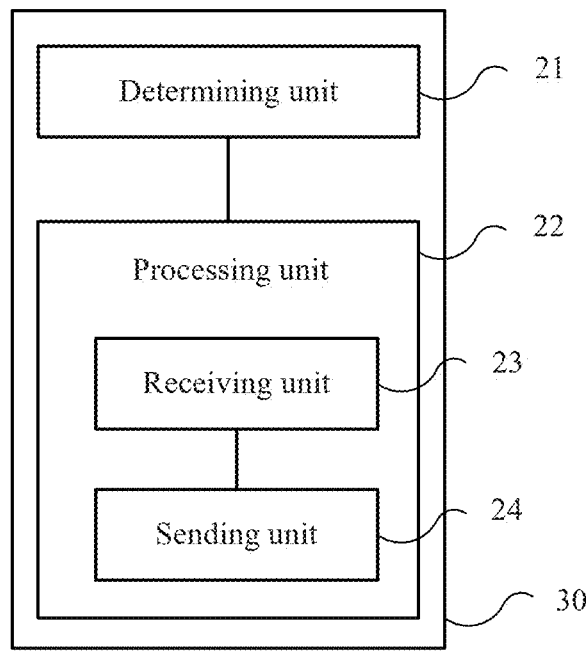
FIG. 3 is a schematic block diagram of user equipment according to another embodiment of the present invention.

FIG. 3 is a schematic block diagram of user equipment according to another embodiment of the present invention. It should be understood that a part that is the same as that in FIG. 2 and that is in FIG. 3 uses a same number.

A processing unit 22 in the user equipment 30 in FIG. 3 may transmit, based on a frame structure determined by a determining unit 21, information in a serving cell; or a processing unit 22 in the user equipment 20 may send and receive, based on a frame structure determined by a determining unit 21, information in a serving cell. It should be understood that information transmission may include all information transmission performed based on the frame structure. Downlink transmission may include physical downlink shared channel transmission, physical downlink control channel transmission and/or enhanced physical downlink control channel transmission, physical HARQ indicator channel transmission, downlink reference signal transmission, and the like. Uplink transmission may include physical uplink shared channel transmission, physical uplink control channel transmission, uplink reference signal transmission, and the like. Transmission related to a physical downlink shared channel and the physical uplink shared channel transmission are usually performed according to a specific hybrid automatic retransmission timing. Information transmission in all embodiments of the present invention may be information sending and receiving.

Optionally, in another embodiment, the processing unit 22 may include a receiving unit 23 and a sending unit 24. The receiving unit 23 may receive, in the serving cell in a subframe (n−k), physical downlink shared channel transmission or a downlink control channel indicating downlink semi-persistent scheduling release, where n is an integer. The sending unit 24 may send, in a subframe n, a hybrid automatic repeat request-acknowledgment HARQ-ACK response corresponding to the physical downlink shared channel transmission or the downlink control channel in the serving cell in the subframe (n−k). In all the embodiments of the present invention, the downlink control channel may be a physical downlink control channel (Physical Downlink Control Channel, PDCCH) or an enhanced physical downlink control channel (Enhanced Physical Downlink Control Channel, EPDCCH). In all the embodiments of the present invention, sending the corresponding hybrid automatic repeat request-acknowledgment HARQ-ACK response in the serving cell in the subframe (n−k) may be sending the HARQ-ACK response of the physical downlink shared channel transmission or the downlink control channel indicating the downlink semi-persistent scheduling release, where the physical downlink shared channel transmission or the downlink control channel is received in the serving cell in the subframe (n−k). Therefore, the sending unit 24 may also send, in a subframe n, the HARQ-ACK response of the physical downlink shared channel transmission or the downlink control channel indicating the downlink semi-persistent scheduling release, where the physical downlink shared channel transmission or the downlink control channel is received by the receiving unit 23.

Optionally, in another embodiment, the receiving unit 23 may receive, in a subframe i, a downlink control channel that schedules a physical uplink shared channel; and the sending unit 24 may send, in the serving cell in a subframe (i+k), the physical uplink shared channel that is scheduled by the downlink control channel received by the receiving unit 23, where i is an integer.

It should be understood that the downlink control channel that schedules the physical uplink shared channel may indicate that a downlink control information format corresponding to the downlink control channel is a downlink control information format (Downlink Control Information Format, DCI format) 0 or a DCI format 4. The downlink control channel that schedules the physical uplink shared channel may also be referred to as an uplink grant (UL grant).

Optionally, in another embodiment, the sending unit 24 may send a physical uplink shared channel in the serving cell in a subframe j; and the receiving unit 23 may receive, in a subframe (j+k), a HARQ-ACK that is corresponding to the physical uplink shared channel sent by the sending unit 24, where j is an integer.

It should be understood that, that the receiving unit 23 receives, in a subframe (j+k), a HARQ-ACK corresponding to the PUSCH may be that the receiving unit 23 receives, in the subframe (j+k), a PHICH corresponding to the PUSCH, where the PHICH carries the HARQ-ACK corresponding to the PUSCH.

Optionally, in another embodiment, the receiving unit 23 may receive, in a subframe m, a HARQ-ACK corresponding to a physical uplink shared channel; and the sending unit 24 may send, in the serving cell in a subframe (m+k), the physical uplink shared channel that is corresponding to the HARQ-ACK received by the receiving unit 23, where m is an integer.

It should be understood that the HARQ-ACK corresponding to the physical uplink shared channel may be carried on a PHICH. Therefore, in this case, the step may also be as follows. The receiving unit 23 may receive a PHICH in a subframe m, and the sending unit 24 may send, in the serving cell in a subframe (m+k), a physical uplink shared channel corresponding to the PHICH.

It should be further understood that a value of k in the processing unit 22 is the same as a value of k in the determining unit 21. When the processing unit 22 transmits, based on the frame structure determined by the determining unit 21, information in the serving cell, for different uplink-downlink configurations, an uplink HARQ timing and a downlink HARQ timing do not change, and for the uplink HARQ timing and the downlink HARQ timing, k remains unchanged. Therefore, the frame structure has an advantage of using one HARQ timing for different uplink-downlink configurations, so that implementation complexity and protocol complexity can be reduced.

FIG. 4 is a schematic structural block diagram of a special subframe according to an embodiment of the present invention.

In this embodiment of the present invention, a specific subframe structure of the special subframe is not limited. It should be understood that, in this embodiment of the present invention, the subframe shown in FIG. 1 may be used as a special subframe. The first subframe no may be used as a first special subframe, and the second subframe 120 may be used as a second special subframe. Optionally, in another embodiment, a first special subframe and a second special subframe in FIG. 4 may also be used in this embodiment of the present invention.

The special subframe shown in FIG. 4 is a subframe of 0.25 ms. Each subframe includes 14 time domain symbols. It should be understood that, in this embodiment of the present invention, a multiple access manner of a time domain symbol is not limited. A time domain symbol in this embodiment of the present invention may be an SC-FDMA symbol, or may be an OFDM symbol.

FIG. 4 includes a first special subframe 410 and a second special subframe 420. The first special subframe 410 is mainly used for downlink transmission, and the second special subframe 420 is mainly used for uplink transmission. Among 14 symbols in the first special subframe 410, 12 symbols 411 may be used for downlink transmission, only one symbol 412 may be used in a guard period (Guard Period, GP), and only one symbol 413 may be used for uplink transmission. Among 14 symbols in the second special subframe 420, only one symbol 421 may be used for downlink transmission, only one symbol 422 may be used in the GP, and 12 symbols 423 may be used for uplink transmission.

The symbol 413 that is used for uplink transmission and that is in the first special subframe 410 may be used to merely transmit a physical uplink control channel and/or a sounding reference signal (Sounding Reference Signal, SRS). The symbol 421 that is used for downlink transmission and that is in the second special subframe 420 may be used to merely transmit a physical downlink control channel and/or a downlink reference signal. The downlink reference signal herein may be a cell-specific reference signal (Cell-specific reference signal, CRS).

It should be understood that, in this embodiment of the present invention, a structure of a subframe of 1 ms may be further used. The structure of the subframe of 1 ms is consistent with a structure of the special subframe shown in FIG. 4. Except that a length of each time domain symbol is different from that in FIG. 4, all other characteristics of a first special subframe and a second special subframe are consistent with those shown in FIG. 4. This is not described herein. It should be understood that, in the structure of the subframe of 1 ms, a length of a GP is also one time domain symbol, which is the same as that shown in FIG. 4. Because a length of one time domain symbol in the structure of the subframe of 1 ms is inconsistent with a length of one time domain symbol in FIG. 4, it may also be considered that the length of the GP in the subframe of 1 ms is inconsistent with a length of the GP in FIG. 4.

It should be understood that, in this embodiment of the present invention, a value of k, an uplink-downlink configuration, and a length of each subframe are not limited. Optionally, in an embodiment, when the length of each subframe is 0.2 ms, the value of k may be 3. Optionally, in another embodiment, when the length of each subframe is 0.25 ms, the value of k may be 2. Optionally, in another embodiment, when the length of each subframe is 1 ms, the value of k may be 4. Specifically, the following separately describes two types of frame structures with reference to FIG. 5 and FIG. 6.

Figure 5:
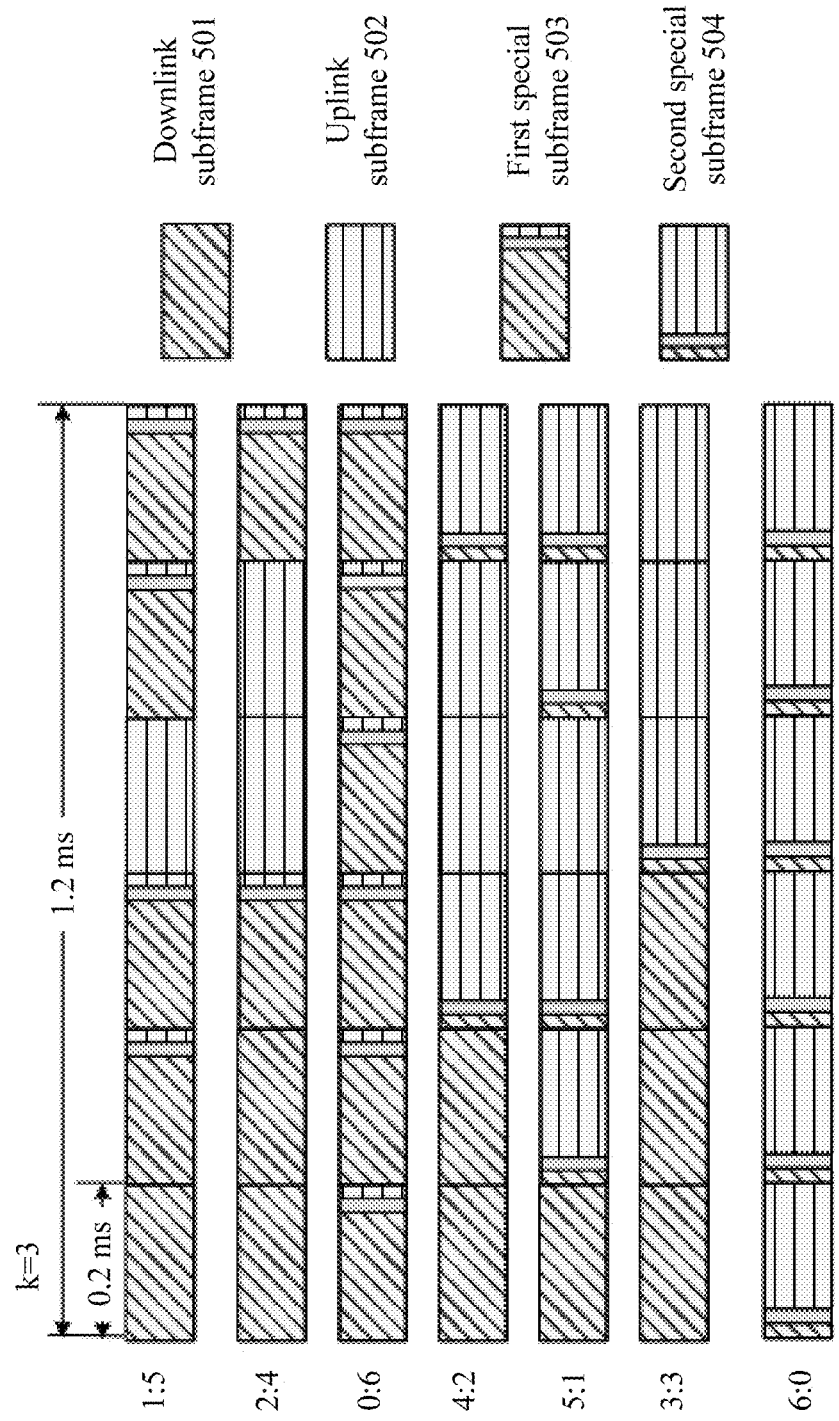
FIG. 5 is a schematic structural block diagram of a frame structure according to an embodiment of the present invention.

FIG. 5 is a schematic structural block diagram of a frame structure according to an embodiment of the present invention. FIG. 5 shows a schematic diagram of a frame structure in which when a length of a subframe in the frame structure is 0.2 ms, k is 3.

The frame structure shown in FIG. 5 may include at least one of a downlink subframe 501, an uplink subframe 502, a first special subframe 503, or a second special subframe 504.

Specifically, a frame shown in FIG. 5 may include merely the first special subframe 503 and/or the second special subframe 504, may include the downlink subframe 501, the uplink subframe 502, and the first special subframe 503, or may include the downlink subframe 501, the uplink subframe 502, and the second special subframe 504. It is assumed that the six subframes are subframes 0 to l, where l=0, 1, 2, 3, 4, or 5.

When an uplink-downlink configuration is 1:5, one frame may include one downlink subframe 501, one uplink subframe 502, and four first special subframes 503. A subframe 0 may be the downlink subframe 501, a subframe 3 may be the uplink subframe 502, and four remaining subframes may be the first special subframes 503.

When the uplink-downlink configuration is 2:4, one frame may include two downlink subframes 501, two uplink subframes 502, and two first special subframes 503. A subframe 0 and a subframe 1 may be the downlink subframes 501, a subframe 3 and a subframe 4 may be the uplink subframes 502, and two remaining subframes may be the first special subframes 503.

When the uplink-downlink configuration is 0:6, one frame may include six first special subframes 503.

When the uplink-downlink configuration is 4:2, one frame may include two downlink subframes 501, two uplink subframes 502, and two second special subframes 504. A subframe 0 and a subframe 1 may be the downlink subframes 501, a subframe 3 and a subframe 4 may be the uplink subframes 502, and two remaining subframes may be the second special subframes 504.

When the uplink-downlink configuration is 5:1, one frame may include one downlink subframe 501, one uplink subframe 502, and four second special subframes 504. A subframe 0 may be the downlink subframe 501, a subframe 3 may be the uplink subframe 502, and four remaining subframes may be the second special subframes 504.

When the uplink-downlink configuration is 3:3, one frame 550 may include three downlink subframes 501, two uplink subframes 502, and one second special subframe 504. A subframe 0, a subframe 1, and a subframe 2 may be the downlink subframes 501, a subframe 4 and a subframe 5 may be the uplink subframes 502, and a subframe 3 may be the second special subframe 504.

Optionally, in another embodiment, when the uplink-downlink configuration is 3:3, the frame 550 may also include two downlink subframes 501, three uplink subframes 502, and one first special subframe 504. A subframe 0 and a subframe 1 may be the downlink subframes 501, a subframe 3, a subframe 4, and a subframe 5 may be the uplink subframes 502, and a subframe 2 may be the first special subframe 504.

In conclusion, methods for determining several frame structures may follow the following rule:

Optionally, it is assumed that the uplink-downlink configuration is X:Y. Both X and Y are positive numbers, X may indicate a quantity of subframes that may be used for transmitting a physical uplink shared channel and that are in one frame, and Y may indicate a quantity of subframes that may be used for transmitting a physical uplink shared channel and that are in the frame. That user equipment or a base station may determine a frame structure of a serving cell according to the uplink-downlink configuration of the serving cell may be as follows:

If X is less than Y, the frame structure of the serving cell may be as follows: One frame includes (X+Y) subframes, and the (X+Y) subframes include X uplink subframes, X downlink subframes, and (Y−X) first special subframes. In this case, it may be learned that (X+Y) is equal to 2k, and X is equal to N. If X is greater than Y, the frame structure of the serving cell may be as follows: One frame includes (X+Y) subframes, and the (X+Y) subframes include Y uplink subframes, Y downlink subframes, and (X−Y) second special subframes. In this case, it may be learned that (X+Y) is equal to 2k, and Y is equal to N, or if X is equal to Y, the frame structure of the serving cell may be as follows: One frame includes (X+Y) subframes, and the (X+Y) subframes include X uplink subframes, (X−1) downlink subframes, and one first special subframe; or one frame includes (X+Y) subframes, and the (X+Y) subframes include (X−1) uplink subframes, X downlink subframes, and one second special subframe. In this case, it may be learned that (X+Y) is equal to 2k, and X is equal to N.

Figure 6:
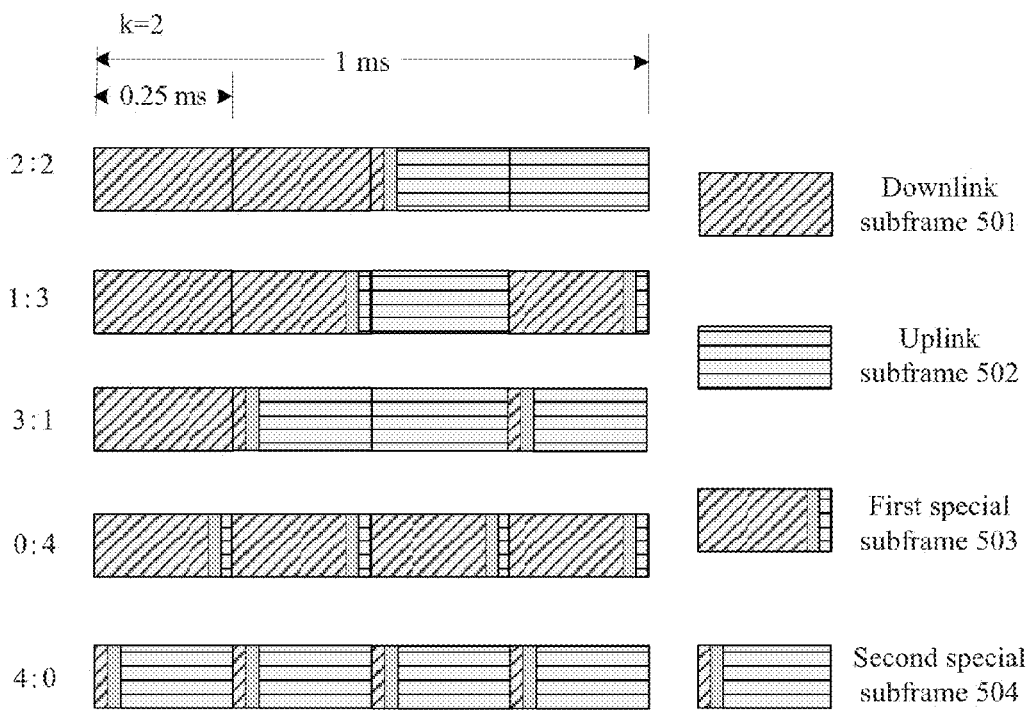
FIG. 6 is a schematic structural block diagram of a frame structure according to another embodiment of the present invention.

FIG. 6 is a schematic structural block diagram of a frame structure according to another embodiment of the present invention. FIG. 6 shows a schematic diagram of a frame structure in which when a length of a subframe in the frame structure is 0.25 ms, k is 2.

The frame structure shown in FIG. 6 may include at least one of the downlink subframe 501, the uplink subframe 502, the first special subframe 503, or the second special subframe 504 shown in FIG. 5.

Specifically, a frame shown in FIG. 6 may also include merely the first special subframe 503 and/or the second special subframe 504, or may include the downlink subframe 501, the uplink subframe 502, and the first special subframe 503, or may include the downlink subframe 501, the uplink subframe 502, and the second special subframe 504. It is assumed that the four subframes are subframes 0 to l, where l=0, 1, 2, or 3.

When an uplink-downlink configuration is 0:4, one frame may include four first special subframes 503.

When the uplink-downlink configuration is 1:3, one frame may include one downlink subframe 501, one uplink subframe 502, and two first special subframes 503. A subframe 0 may be the downlink subframe 501, a subframe 2 may be the uplink subframe 502, and two remaining subframes may be the first special subframes 503.

When the uplink-downlink configuration is 2:2, one frame may include two downlink subframes 501, one uplink subframe 502, and one second special subframe 504. A subframe 0 and a subframe 1 may be the downlink subframes 501, a subframe 3 may be the uplink subframe 502, and a subframe 2 may be the second special subframe 504.

Optionally, in another embodiment, when the uplink-downlink configuration is 2:2, one frame may also include one downlink subframe 501, two uplink subframes 502, and one first special subframe 504. A subframe 0 may be the downlink subframe 501, a subframe 2 and a subframe 3 may be the uplink subframes 502, and a subframe 1 may be the first special subframe 504.

When the uplink-downlink configuration is 3:1, one frame may include one downlink subframe 501, one uplink subframe 502, and two second special subframes 504. A subframe 0 may be the downlink subframe 501, a subframe 2 may be the uplink subframe 502, and two remaining subframes may be the second special subframes 504.

In conclusion, the method for determining several frame structures may also follow the rule described in FIG. 5. To avoid repetition, details are not described herein.

Figure 7:
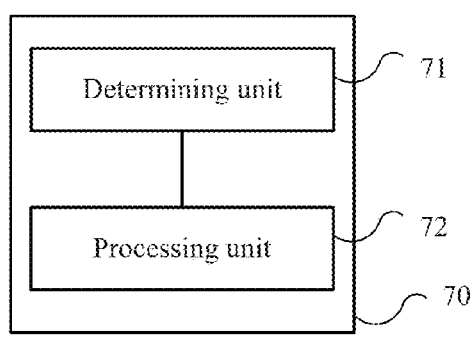
FIG. 7 is a schematic block diagram of a base station according to an embodiment of the present invention.

FIG. 7 is a schematic block diagram of a base station according to an embodiment of the present invention. It should be understood that the base station 70 shown in FIG. 7 may implement a method shown in FIG. 10. The base station 70 may include a determining unit 71 and a processing unit 72.

The determining unit 71 determines a frame structure of a serving cell of user equipment, where each frame based on the frame structure includes 2k subframes, the 2k subframes include at least (N−1) downlink subframes, at least (N−1) uplink subframes, and at least one special subframe, the special subframe is a first special subframe or a second special subframe, N is a positive integer greater than or equal to 1, and k is a positive integer greater than 1; and each frame includes N downlink subframes, N uplink subframes, and (2k−2N) special subframes, and N is less than k; or each frame includes N downlink subframes, (N−1) uplink subframes, and one second special subframe, and N is equal to k; or each frame includes (N−1) downlink subframes, N uplink subframes, and one first special subframe, and N is equal to k.

Based on the frame structure determined by the determining unit 71, the processing unit 72 sends, in the serving cell, information to the user equipment and receives, in the serving cell, information from the user equipment.

In this embodiment of the present invention, a downlink subframe, an uplink subframe, and a special subframe are introduced in a radio frame, and a frame structure of a serving cell is determined. Information is sent and received based on the frame structure, so that an uplink HARQ timing and a downlink HARQ timing remain unchanged and are equal to each other for different uplink-downlink configurations. Therefore, in this embodiment of the present invention, a unified hybrid automatic retransmission timing is used, so that complexity of a HARQ timing is reduced. Specifically, in this embodiment of the present invention, not only a unified HARQ-ACK timing but also a unified HARQ retransmission or scheduling timing can be ensured.

It should be understood that the serving cell in this embodiment of the present invention may be a serving cell configured by a network side device for the user equipment, a serving cell that serves the user equipment, or a serving cell that the user equipment accesses. The serving cell (serving cell) in this embodiment of the present invention may also be referred to as a component carrier (component carrier). The serving cell in this embodiment of the present invention may be a primary serving cell (Primary serving cell) of the user equipment, or may be a secondary serving cell (Secondary serving cell) of the user equipment.

It should be further understood that, in this embodiment of the present invention, a method for determining the frame structure of the serving cell by the determining unit 71 is not limited, provided that a determined frame structure meets a requirement. For example, in this embodiment of the present invention, a rule that may be followed by a determining method described in FIG. 5 may be used. To avoid repetition, details are not described herein. In this embodiment of the present invention, a special subframe shown in FIG. 1 or FIG. 4 may be used. The frame structure determined in this embodiment of the present invention may be a frame structure shown in FIG. 5 and FIG. 6.

It should be understood that the frame structure that is of the serving cell of the user equipment and that is determined by the determining unit 71 in the base station 70 in FIG. 7 may be the same as the frame structure that is of the serving cell and that is determined by the determining unit 21 in the user equipment 20 in FIG. 3. To avoid repetition, details are not described herein.

Optionally, in another embodiment, the special subframe may include a time domain symbol used for downlink transmission, a guard period GP, and a time domain symbol used for uplink transmission; in the first special subframe, a quantity of time domain symbols used for downlink transmission is greater than a quantity of time domain symbols used for uplink transmission; and in the second special subframe, a quantity of time domain symbols used for downlink transmission is less than a quantity of time domain symbols used for uplink transmission.

Optionally, in another embodiment, the first special subframe may be the first subframe no in FIG. 1, and the second special subframe may be the second subframe 120 in FIG. 1.

Optionally, in another embodiment, the first special subframe and the second special subframe in this embodiment of the present invention may be respectively the first special subframe 410 and the second special subframe 420 in FIG. 4.

Optionally, in another embodiment, the determining unit 71 may determine the frame structure of the serving cell of the user equipment according to an uplink-downlink configuration of the serving cell, where if the uplink-downlink configuration defines that, in the frame structure, a quantity of subframes used for transmitting a physical uplink shared channel is greater than a quantity of subframes used for transmitting a physical downlink shared channel, the (2k−2N) special subframes are (2k−2N) second special subframes; or if the uplink-downlink configuration defines that, in the frame structure, a quantity of subframes used for transmitting a physical uplink shared channel is less than a quantity of subframes used for transmitting a physical downlink shared channel, the (2k−2N) special subframes are (2k−2N) first special subframes.

Optionally, in another embodiment, the frame structure in this embodiment of the present invention may meet the following feature: If a subframe l is a downlink subframe, a subframe (l+k) is an uplink subframe or a second special subframe, and l is an integer; or if a subframe l is an uplink subframe, a subframe (l+k) is a downlink subframe or a first special subframe, and l is an integer.

Optionally, in another embodiment, a time domain symbol that may be used for uplink transmission and that is in the first special subframe is used to transmit a physical uplink control channel and/or a sounding reference signal SRS.

Optionally, in another embodiment, a time domain symbol that is used for downlink transmission and that is in the second special subframe is used to transmit a physical downlink control channel and/or a downlink reference signal.

Optionally, in another embodiment, each subframe in the 2k subframes is a subframe of 0.2 ms or a subframe of 0.25 ms. That is, a length of each subframe in the 2k subframes may be 0.2 ms or 0.25 ms.

It should be understood that, in this embodiment of the present invention, a value of k, an uplink-downlink configuration, and a length of each subframe are not limited. Optionally, in an embodiment, when the length of each subframe is 0.2 ms, the value of k may be 3. Optionally, in another embodiment, when the length of each subframe is 0.25 ms, the value of k may be 2. When the length of each subframe is 1 ms, the value of k may be 4.

Optionally, in another embodiment, the base station may obtain an uplink-downlink configuration index and an uplink-downlink configuration table of the serving cell. The frame structure of the serving cell is determined according to a configured uplink-downlink configuration index and a configured uplink-downlink configuration table. A method for determining the frame structure of the serving cell by the base station may be the same as a method for determining the frame structure by the user equipment in FIG. 2. To avoid repetition, details are not described herein.

In this embodiment of the present invention, a downlink subframe, an uplink subframe, and a special subframe are introduced in a radio frame, and a frame structure of a serving cell is determined. Information is sent and received based on the frame structure, so that an uplink HARQ timing and a downlink HARQ timing remain unchanged and are equal to each other for different uplink-downlink configurations. Therefore, in this embodiment of the present invention, a unified hybrid automatic retransmission timing is used, so that complexity of a HARQ timing is reduced. Specifically, in this embodiment of the present invention, not only a unified HARQ-ACK timing but also a unified HARQ retransmission or scheduling timing can be ensured.

In addition, in this embodiment of the present invention, the downlink subframe, the uplink subframe, and the special subframe are introduced, and each subframe is a short subframe. In this way, not only one hybrid automatic retransmission timing is used but also overheads of a CP and a GP are reduced.

FIG. 8 is a schematic block diagram of a base station according to another embodiment of the present invention. It should be understood that a part that is the same as that in FIG. 7 and that is in FIG. 8 uses a same number.

A processing unit 72 in the base station 80 in FIG. 8 may send and receive, based on a frame structure determined by a determining unit 71, information in a serving cell; or a processing unit 72 in the base station 80 may send and receive, based on a frame structure determined by a determining unit 71, information in a serving cell. It should be understood that information transmission may include all information transmission performed based on the frame structure. Downlink transmission may include physical downlink shared channel transmission, physical downlink control channel transmission and/or enhanced physical downlink control channel transmission, physical HARQ indicator channel transmission, downlink reference signal transmission, and the like. Uplink transmission may include physical uplink shared channel transmission, physical uplink control channel transmission, uplink reference signal transmission, and the like. Transmission related to the physical downlink shared channel and the physical uplink shared channel transmission are usually performed according to a specific hybrid automatic retransmission timing. Information transmission in all embodiments of the present invention may be information sending and receiving.

Optionally, in another embodiment, the processing unit 72 may include a receiving unit 73 and a sending unit 74. The sending unit 74 may send, to user equipment in a subframe (n−k) in the serving cell, physical downlink shared channel transmission or a downlink control channel indicating downlink semi-persistent scheduling release, where n is an integer. The receiving unit 73 may receive, in a subframe n, a hybrid automatic repeat request-acknowledgment HARQ-ACK response that is fed back by the user equipment and that is corresponding to the physical downlink shared channel transmission or the downlink control channel in the serving cell in the subframe (n−k). In all the embodiments of the present invention, the downlink control channel may be a physical downlink control channel (Physical Downlink Control Channel, PDCCH) or an enhanced physical downlink control channel (Enhanced Physical Downlink Control Channel, EPDCCH). In all the embodiments of the present invention, receiving, in a subframe n, the corresponding hybrid automatic repeat request-acknowledgment HARQ-ACK response fed back in the serving cell by the user equipment in the subframe (n−k) may be: receiving, in the subframe n, the hybrid automatic repeat request-acknowledgment HARQ-ACK response that is corresponding to the physical downlink shared channel transmission or the downlink control channel indicating the downlink semi-persistent scheduling release, where the physical downlink shared channel transmission or the downlink control channel is sent in the serving cell by the base station to the user equipment in the subframe (n−k). Therefore, the receiving unit 73 may also receive, in the subframe n, the HARQ-ACK response of the physical downlink shared channel transmission or the downlink control channel indicating the downlink semi-persistent scheduling release, where the physical downlink shared channel transmission or the downlink control channel is sent by the sending unit 74.

Optionally, in another embodiment, the sending unit 74 may send, to the user equipment in a subframe i, a downlink control channel that schedules a physical uplink shared channel; and the receiving unit 73 may receive, in the serving cell in a subframe (i+k), the physical uplink shared channel that is scheduled by the downlink control channel sent by the sending unit 74 to the user equipment in the subframe i, where i is an integer.

It should be understood that the downlink control channel that schedules the physical uplink shared channel may indicate that a downlink control information format corresponding to the downlink control channel is a DCI format 0 or a DCI format 4. The downlink control channel that schedules the physical uplink shared channel may also be referred to as an uplink grant (UL grant).

Optionally, in another embodiment, the receiving unit 73 may receive, in the serving cell in a subframe j, a physical uplink shared channel sent by the user equipment; and the sending unit 74 may send, in a subframe (j+k), a HARQ-ACK corresponding to the physical uplink shared channel that is received by the receiving unit 73, where j is an integer.

It should be understood that, that the sending unit 74 sends, in a subframe (j+k), a HARQ-ACK corresponding to the PUSCH may be that the sending unit 74 sends, in the subframe (j+k), a PHICH corresponding to the PUSCH, where the PHICH carries the HARQ-ACK corresponding to the PUSCH.

Optionally, in another embodiment, the sending unit 74 may send, in a subframe m, a HARQ-ACK that is corresponding to a physical uplink shared channel sent by the user equipment; and the receiving unit 73 may receive, in the serving cell in a subframe (m+k), retransmission of the physical uplink shared channel sent by the sending unit 74, where m is an integer.

It should be understood that the HARQ-ACK corresponding to the physical uplink shared channel may be carried on a PHICH. Therefore, in this case, the step may also be as follows: The sending unit 74 may send a PHICH in a subframe m; and the receiving unit 73 may receive, in the serving cell in a subframe (m+k), a physical uplink shared channel corresponding to the PHICH.

It should be further understood that a value of k in the processing unit 72 is the same as a value of k in the determining unit 71. When the processing unit 72 transmits, based on the frame structure determined by the determining unit 71, information in the serving cell, for different uplink-downlink configurations, an uplink HARQ timing and a downlink HARQ timing do not change, and for the uplink HARQ timing and the downlink HARQ timing, k remains unchanged. Therefore, the frame structure has an advantage of using one HARQ timing for different uplink-downlink configurations, so that implementation complexity and protocol complexity can be reduced.

FIG. 9 is a schematic flowchart of an information transmission method according to an embodiment of the present invention. The method shown in FIG. 9 may be performed by the user equipment shown in FIG. 2 or FIG. 3. The method may include the following steps:

910. The user equipment determines a frame structure of a serving cell, where each frame based on the frame structure includes 2k subframes, the 2k subframes include at least (N−1) downlink subframes, at least (N−1) uplink subframes, and at least one special subframe, the special subframe is a first special subframe or a second special subframe, N is a positive integer greater than or equal to 1, and k is a positive integer greater than 1; and each frame includes N downlink subframes, N uplink subframes, and (2k−2N) special subframes, and N is less than k; or each frame includes N downlink subframes, (N−1) uplink subframes, and one second special subframe, and N is equal to k; or each frame includes (N−1) downlink subframes, N uplink subframes, and one first special subframe, and N is equal to k.

920. The user equipment sends and receives, based on the frame structure, information in the serving cell.

In this embodiment of the present invention, a downlink subframe, an uplink subframe, and a special subframe are introduced in a radio frame, and a frame structure of a serving cell is determined. Information is sent and received based on the frame structure, so that an uplink HARQ timing and a downlink HARQ timing remain unchanged and are equal to each other for different uplink-downlink configurations. Therefore, in this embodiment of the present invention, a unified hybrid automatic retransmission timing is used, so that complexity of a HARQ timing is reduced. Specifically, in this embodiment of the present invention, not only a unified HARQ-ACK timing but also a unified HARQ retransmission or scheduling timing can be ensured.

It should be understood that the serving cell in this embodiment of the present invention may be a serving cell configured by a network side device for the user equipment, a serving cell that serves the user equipment, or a serving cell that the user equipment accesses. The serving cell (serving cell) in this embodiment of the present invention may also be referred to as a component carrier (component carrier). The serving cell in this embodiment of the present invention may be a primary serving cell (Primary serving cell) of the user equipment, or may be a secondary serving cell (Secondary serving cell) of the user equipment.

It should be further understood that, in this embodiment of the present invention, a method for determining the frame structure of the serving cell by the user equipment is not limited, provided that a determined frame structure meets a requirement. For example, in this embodiment of the present invention, a rule that may be followed by a determining method described in FIG. 5 may be used. To avoid repetition, details are not described herein. In this embodiment of the present invention, a special subframe shown in FIG. 1 or FIG. 4 may be used. The frame structure determined in this embodiment of the present invention may be a frame structure shown in FIG. 5 and FIG. 6.

Optionally, in another embodiment, in step 910, the user equipment may determine the frame structure of the serving cell according to an uplink-downlink configuration of the serving cell. Different uplink-downlink configurations are corresponding to different frame structures, and frames corresponding to the different frame structures are formed differently.

The frames corresponding to the different frame structures may have the following commonality: One frame includes 2k subframes that include at least (N−1) downlink subframes, at least (N−1) uplink subframes, and at least one special subframe, where k is a positive integer greater than 1, and N is a positive integer greater than or equal to 1.

Optionally, in another embodiment, the special subframe may include a time domain symbol used for downlink transmission, a guard period GP, and a time domain symbol used for uplink transmission; in the first special subframe, a quantity of time domain symbols used for downlink transmission is greater than a quantity of time domain symbols used for uplink transmission; and in the second special subframe, a quantity of time domain symbols used for downlink transmission is less than a quantity of time domain symbols used for uplink transmission.

The downlink subframe may merely include a time domain symbol used for downlink transmission. The uplink subframe may merely include a time domain symbol used for uplink transmission. A subframe type of a special subframe may be a first special subframe mainly used for downlink transmission or a second special subframe mainly used for uplink transmission. The first special subframe may include a time domain symbol used for downlink transmission, a guard period GP, and a time domain symbol used for uplink transmission, and a quantity of time domain symbols used for downlink transmission is greater than a quantity of time domain symbols used for uplink transmission. The second special subframe may include a time domain symbol used for downlink transmission, a guard period GP, and a time domain symbol used for uplink transmission, and a quantity of time domain symbols used for downlink transmission is less than a quantity of time domain symbols used for uplink transmission.

Optionally, in another embodiment, the first special subframe may be the first subframe no in FIG. 1, and the second special subframe may be the second subframe 120 in FIG. 1.

Optionally, in another embodiment, the first special subframe and the second special subframe in this embodiment of the present invention may be respectively the first special subframe 410 and the second special subframe 420 in FIG. 4.

Optionally, in another embodiment, in step 910, the user equipment may determine the frame structure of the serving cell according to an uplink-downlink configuration of the serving cell, where if the uplink-downlink configuration defines that, in the frame structure, a quantity of subframes used for transmitting a physical uplink shared channel is greater than a quantity of subframes used for transmitting a physical downlink shared channel, the (2k−2N) special subframes are (2k−2N) second special subframes; or if the uplink-downlink configuration defines that, in the frame structure, a quantity of subframes used for transmitting a physical uplink shared channel is less than a quantity of subframes used for transmitting a physical downlink shared channel, the (2k−2N) special subframes are (2k−2N) first special subframes.

In other words, if the uplink-downlink configuration defines that, in the frame structure, the quantity of subframes used for transmitting the physical uplink shared channel is greater than the quantity of subframes used for transmitting the physical downlink shared channel, each subframe includes N downlink subframes, N uplink subframes, and (2k−2N) second special subframes, and N is less than k; or if the uplink-downlink configuration defines that, in the frame structure, the quantity of subframes used for transmitting the physical uplink shared channel is less than the quantity of subframes used for transmitting the physical downlink shared channel, each subframe includes N downlink subframes, N uplink subframes, and (2k−2N) first special subframes. Further, in this embodiment of the present invention, locations of a downlink subframe, an uplink subframe, and a special subframe in one frame may be determined in the following manner: N downlink subframes are first arranged in the front of the frame; and if it is assumed that the N downlink subframes are corresponding to a subframe l in the frame, where l=0, 1, 2, . . . , (N−1), a subframe (l+k) in the frame is an uplink subframe, and remaining subframes are special subframes.

Optionally, in another embodiment, the frame structure in this embodiment of the present invention may meet the following feature: If a subframe l is a downlink subframe, a subframe (l+k) is an uplink subframe or a second special subframe, and l is an integer; or if a subframe l is an uplink subframe, a subframe (l+k) is a downlink subframe or a first special subframe, and l is an integer.

Optionally, in another embodiment, one frame may include N downlink subframes, (N−1) uplink subframes, and one second special subframe; or one frame may include (N−1) downlink subframes, N uplink subframes, and one first special subframe. Further, in this embodiment of the present invention, locations of a downlink subframe, an uplink subframe, and a special subframe in one frame may be determined in the following manner: The downlink subframe is arranged at the first subframe location in the frame, the uplink subframe is arranged at the last subframe location in the frame, and the special subframe is arranged between the first subframe location and the last subframe location.

Optionally, in another embodiment, a time domain symbol that may be used for uplink transmission and that is in the first special subframe is used to transmit a physical uplink control channel and/or a sounding reference signal SRS.

Optionally, in another embodiment, a time domain symbol that is used for downlink transmission and that is in the second special subframe is used to transmit a physical downlink control channel and/or a downlink reference signal.

Optionally, in another embodiment, each subframe in the 2k subframes is a subframe of 0.2 ms or a subframe of 0.25 ms. That is, a length of each subframe in the 2k subframes may be 0.2 ms or 0.25 ms.

It should be understood that, in this embodiment of the present invention, a value of k, an uplink-downlink configuration, and a length of each subframe are not limited. Optionally, in an embodiment, when the length of each subframe is 0.2 ms, the value of k may be 3. Optionally, in another embodiment, when the length of each subframe is 0.25 ms, the value of k may be 2. When the length of each subframe is 1 ms, the value of k may be 4.

In this embodiment of the present invention, a downlink subframe, an uplink subframe, and a special subframe are introduced in a radio frame, and a frame structure of a serving cell is determined. Information is sent and received based on the frame structure, so that an uplink HARQ timing and a downlink HARQ timing can remain unchanged and be equal to each other for different uplink-downlink configurations. Therefore, in this embodiment of the present invention, a unified hybrid automatic retransmission timing is used, so that complexity of a HARQ timing is reduced. Specifically, in this embodiment of the present invention, not only a unified HARQ-ACK timing but also a unified HARQ retransmission or scheduling timing can be ensured.

In addition, in this embodiment of the present invention, the downlink subframe, the uplink subframe, and the special subframe are introduced, so that not each subframe in a frame includes a GP. In this way, not only one hybrid automatic retransmission timing is used but also overheads of a CP and a GP are reduced.

Optionally, in another embodiment, the user equipment may obtain an uplink-downlink configuration index and an uplink-downlink configuration table of the serving cell. The frame structure of the serving cell is determined according to a configured uplink-downlink configuration index and a configured uplink-downlink configuration table.

Specifically, detailed descriptions may be made with reference to Table 1 and Table 2 described in FIG. 2. Table 1 may be corresponding to subframes shown in FIG. 1, and Table 2 may be corresponding to subframes corresponding to FIG. 4. To avoid repetition, details are not described herein.

According to the frame structure in this embodiment of the present invention, an uplink subframe and a downlink subframe are introduced in one frame. Therefore, overheads caused by a CP and a GP are reduced. In an example of the frame structure based on Table 1, overheads of a CP and a GP may be shown in Table 3 related in descriptions in FIG. 3. In an example of the frame structure based on Table 2, overheads of a CP and a GP may be shown in Table 4 related in descriptions in FIG. 3. To avoid repetition, details are not described herein.

Therefore, it may be learned from Table 3 and Table 4 that overheads of a CP and a GP may be reduced in the frame structure in this embodiment of the present invention in comparison with the frame structure shown in FIG. 1.

In step 920, the user equipment sends and receives, based on the frame structure determined in step 910, information in the serving cell. It should be understood that information transmission may include all information transmission performed based on the frame structure. Downlink transmission may include physical downlink shared channel transmission, physical downlink control channel transmission and/or enhanced physical downlink control channel transmission, physical HARQ indicator channel transmission, downlink reference signal transmission, and the like. Uplink transmission may include physical uplink shared channel transmission, physical uplink control channel transmission, uplink reference signal transmission, and the like. Transmission related to the physical downlink shared channel and the physical uplink shared channel transmission are usually performed according to a specific hybrid automatic retransmission timing.

Optionally, in another embodiment, in step 920, the uplink HARQ timing may be as follows: The user equipment receives, in the serving cell in a subframe (n−k), physical downlink shared channel transmission or a physical downlink control channel indicating downlink semi-persistent scheduling release, where n is an integer; and the user equipment may send, in a subframe n, a hybrid automatic repeat request-acknowledgment HARQ-ACK response corresponding to the physical downlink shared channel transmission or the downlink control channel in the serving cell in the subframe (n−k). In all embodiments of the present invention, the downlink control channel may be a physical downlink control channel (Physical Downlink Control Channel, PDCCH) or an enhanced physical downlink control channel (Enhanced Physical Downlink Control Channel, EPDCCH). In all the embodiments of the present invention, sending the corresponding hybrid automatic repeat request-acknowledgment HARQ-ACK response in the serving cell in the subframe (n−k) may be: sending the HARQ-ACK response of the physical downlink shared channel transmission or the downlink control channel indicating the downlink semi-persistent scheduling release, where the physical downlink shared channel transmission or the downlink control channel is received in the serving cell in the subframe (n−k).

Optionally, in another embodiment, in step 920, the downlink HARQ timing may be as follows: The user equipment receives, in a subframe i, a downlink control channel that schedules a physical uplink shared channel; and the user equipment may send, in the serving cell in a subframe (i+k), the physical uplink shared channel scheduled by the physical downlink control channel, where i is an integer.

It should be understood that the downlink control channel that schedules the physical uplink shared channel may indicate that a downlink control information format corresponding to the downlink control channel is a DCI format 0 or a DCI format 4. The downlink control channel that schedules the physical uplink shared channel may also be referred to as an uplink grant (UL grant).

Optionally, in another embodiment, in step 920, the downlink HARQ timing may be as follows: The user equipment sends a physical uplink shared channel in the serving cell in a subframe j; and the user equipment may receive, in a subframe (j+k), a HARQ-ACK corresponding to the physical uplink shared channel, where j is an integer.

It should be understood that, that the user equipment receives, in a subframe (j+k), a HARQ-ACK corresponding to the PUSCH may be that the user equipment receives, in the subframe (j+k), a PHICH corresponding to the PUSCH, where the PHICH carries the HARQ-ACK corresponding to the PUSCH.

Optionally, in another embodiment, in step 920, the downlink HARQ timing may be as follows: The user equipment receives, in a subframe m, a HARQ-ACK corresponding to a physical uplink shared channel; and the user equipment may send, in the serving cell in a subframe (m+k), the physical uplink shared channel corresponding to the HARQ-ACK.

It should be understood that the HARQ-ACK corresponding to the physical uplink shared channel may be carried on a PHICH. Therefore, in this case, the step may also be as follows: The user equipment receives a PHICH in a subframe m, and sends, in the serving cell in a subframe (m+k), a physical uplink shared channel corresponding to the PHICH.

It should be further understood that a value of k in step 920 is the same as a value of k in step 910. In step 920, when the user equipment transmits, based on the frame structure, information in the serving cell in step 910, for different uplink-downlink configurations, an uplink HARQ timing and a downlink HARQ timing do not change, and for the uplink HARQ timing and the downlink HARQ timing, k remains unchanged. Therefore, the frame structure has an advantage of using one HARQ timing for different uplink-downlink configurations, so that implementation complexity and protocol complexity can be reduced.

Figure 10:
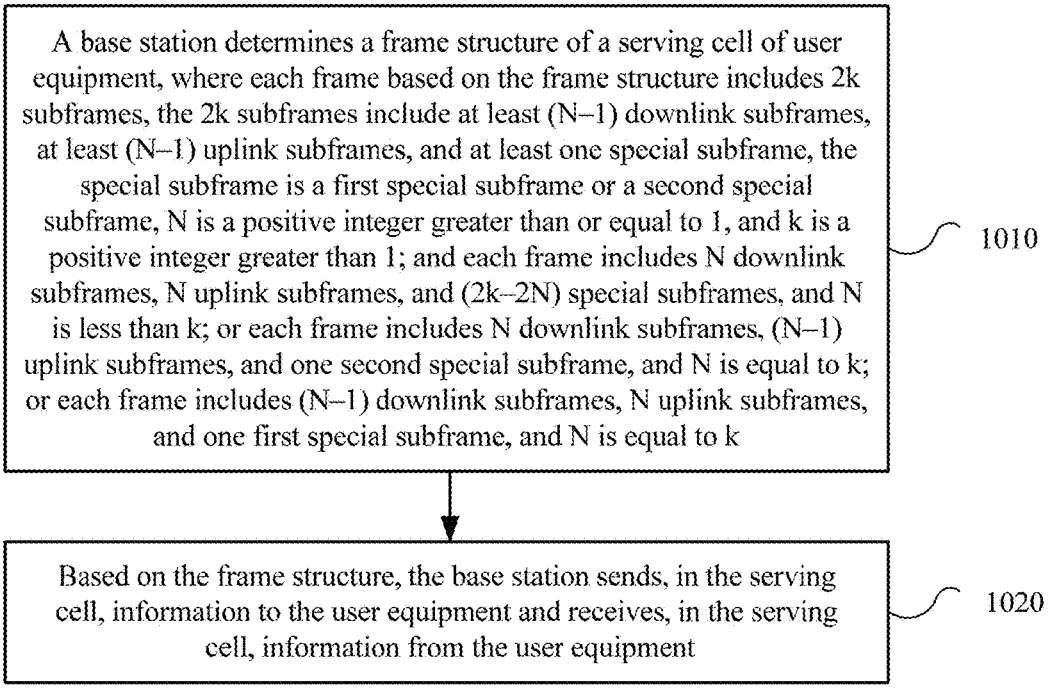
FIG. 10 is a schematic flowchart of an information transmission method according to another embodiment of the present invention.

FIG. 10 is a schematic flowchart of an information transmission method according to another embodiment of the present invention. The method shown in FIG. 10 may be performed by the base station shown in FIG. 7 or FIG. 8. The method may include the following steps:

1010. The base station determines a frame structure of a serving cell of user equipment, where each frame based on the frame structure includes 2k subframes, the 2k subframes include at least (N−1) downlink subframes, at least (N−1) uplink subframes, and at least one special subframe, the special subframe is a first special subframe or a second special subframe, N is a positive integer greater than or equal to 1, and k is a positive integer greater than 1; and each frame includes N downlink subframes, N uplink subframes, and (2k−2N) special subframes, and N is less than k; or each frame includes N downlink subframes, (N−1) uplink subframes, and one second special subframe, and N is equal to k; or each frame includes (N−1) downlink subframes, N uplink subframes, and one first special subframe, and N is equal to k.

1020. Based on the frame structure, the base station sends, in the serving cell, information to the user equipment and receives, in the serving cell, information from the user equipment.

In this embodiment of the present invention, a downlink subframe, an uplink subframe, and a special subframe are introduced in a radio frame, and a frame structure of a serving cell is determined. Information is sent and received based on the frame structure, so that an uplink HARQ timing and a downlink HARQ timing remain unchanged and are equal to each other for different uplink-downlink configurations. Therefore, in this embodiment of the present invention, a unified hybrid automatic retransmission timing is used, so that complexity of a HARQ timing is reduced. Specifically, in this embodiment of the present invention, not only a unified HARQ-ACK timing but also a unified HARQ retransmission or scheduling timing can be ensured.

It should be understood that the frame structure that is of the serving cell and that is determined by the base station in FIG. 10 may be the same as the frame structure that is of the serving cell and that is determined by the user equipment in FIG. 9. To avoid repetition, details are not described herein.

In step 1020, the base station transmits, in the serving cell, information with the user equipment based on the frame structure determined in step 1010. The transmitting information with the user equipment may include sending information to the user equipment or receiving information sent by the user equipment.

It should be understood that information transmission may include all information transmission performed based on the frame structure. Downlink transmission may include physical downlink shared channel transmission, physical downlink control channel transmission and/or enhanced physical downlink control channel transmission, physical HARQ indicator channel transmission, downlink reference signal transmission, and the like. Uplink transmission may include physical uplink shared channel transmission, physical uplink control channel transmission, uplink reference signal transmission, and the like. Transmission related to the physical downlink shared channel and the physical uplink shared channel transmission are usually performed according to a specific hybrid automatic retransmission timing.

Optionally, in another embodiment, in step 1020, the uplink HARQ timing may be as follows: The base station sends, in the serving cell to the user equipment in a subframe (n−k), physical downlink shared channel transmission or a downlink control channel indicating downlink semi-persistent scheduling release, where n is an integer; and the base station may receive, in a subframe n, a hybrid automatic repeat request-acknowledgment HARQ-ACK response that is fed back by the user equipment and that is corresponding to the physical downlink shared channel transmission or the downlink control channel in the serving cell in the subframe (n−k). In all embodiments of the present invention, the downlink control channel may be a physical downlink control channel (Physical Downlink Control Channel, PDCCH) or an enhanced physical downlink control channel (Enhanced Physical Downlink Control Channel, EPDCCH). In all the embodiments of the present invention, receiving, in a subframe n, the corresponding hybrid automatic repeat request-acknowledgment HARQ-ACK response fed back in the serving cell by the user equipment in the subframe (n−k) may be: receiving, in the subframe n, the hybrid automatic repeat request-acknowledgment HARQ-ACK response that is corresponding to the physical downlink shared channel transmission or the downlink control channel indicating the downlink semi-persistent scheduling release, where the physical downlink shared channel transmission or the downlink control channel is sent in the serving cell by the base station to the user equipment in the subframe (n−k).

Optionally, in another embodiment, in step 1020, the downlink HARQ timing may be as follows: The base station sends, to the user equipment in a subframe i, a downlink control channel that schedules a physical uplink shared channel; and the base station may receive, in the serving cell in a subframe (i+k), the physical uplink shared channel scheduled by the physical downlink control channel, where i is an integer.

It should be understood that the downlink control channel that schedules the physical uplink shared channel may indicate that a downlink control information format corresponding to the downlink control channel is a DCI format 0 or a DCI format 4. The downlink control channel that schedules the physical uplink shared channel may also be referred to as an uplink grant (UL grant).

Optionally, in another embodiment, in step 1020, the downlink HARQ timing may be as follows: The base station receives, in the serving cell in a subframe j, a physical uplink shared channel sent by the user equipment; and the base station may send, in a subframe (j+k), a HARQ-ACK corresponding to the physical uplink shared channel, where j is an integer.

It should be understood that when the base station sends, in a subframe (j+k), a HARQ-ACK corresponding to the PUSCH, the base station may send, in the subframe (j+k), a PHICH corresponding to the PUSCH, where the PHICH carries the HARQ-ACK corresponding to the PUSCH.

Optionally, in another embodiment, in step 1020, the downlink HARQ timing may be as follows: The base station sends, in a subframe m, a HARQ-ACK that is corresponding to a physical uplink shared channel sent by the user equipment; and the base station receives retransmission of the physical uplink shared channel in the serving cell in a subframe (m+k).

It should be understood that the HARQ-ACK corresponding to the physical uplink shared channel may be carried on a PHICH. Therefore, in this case, the step may also be as follows: The base station sends a PHICH in a subframe m, and receives, in the serving cell in a subframe (m+k), a physical uplink shared channel corresponding to the PHICH.

It should be further understood that a value of k in step 1020 is the same as a value of k in step low. In step 1020, when the user equipment transmits, based on the frame structure, information in the serving cell in step low, for different uplink-downlink configurations, an uplink HARQ timing and a downlink HARQ timing do not change, and for the uplink HARQ timing and the downlink HARQ timing, k remains unchanged. Therefore, the frame structure has an advantage of using one HARQ timing for different uplink-downlink configurations, so that implementation complexity and protocol complexity can be reduced.

Figure 11:
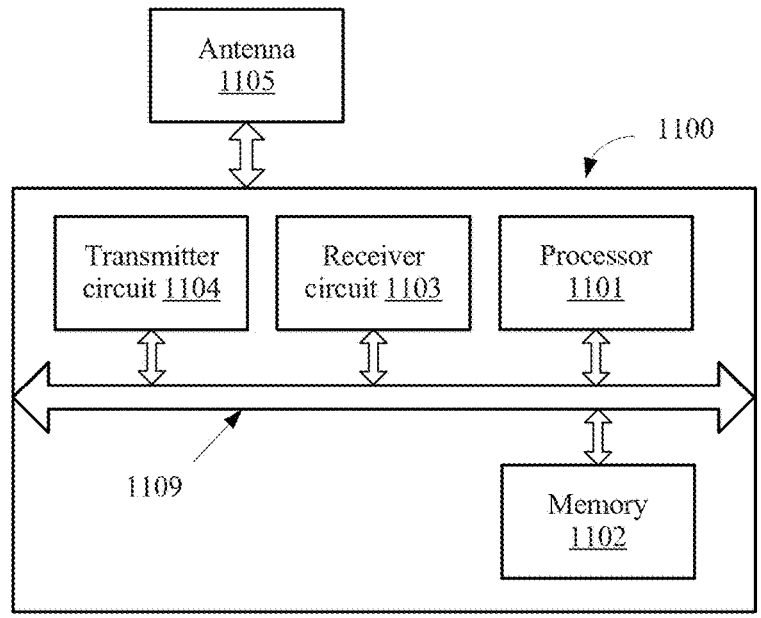
FIG. 11 is a schematic block diagram of user equipment according to another embodiment of the present invention.

FIG. 11 is a schematic block diagram of user equipment according to another embodiment of the present invention. The user equipment 1100 in FIG. 11 may be configured to implement all steps and methods in the foregoing method embodiments. A channel resource of a wireless local area network is divided into multiple child resources in a frequency domain. The user equipment 1100 in FIG. 11 includes a processor 1101, a memory 1102, a receiver circuit 1103, and a transmitter circuit 1104. The processor 1101, the memory 1102, the receiver circuit 1103, and the transmitter circuit 1104 are connected by using a bus system 1109.

In addition, the user equipment 1100 may include an antenna 1105, and the like. The processor 1101 controls an operation of the user equipment 1100. The memory 1102 may include a read-only memory and a random access memory, and provides an instruction and data for the processor 1101. A part of the memory 1102 may further include a nonvolatile random access memory (NVRAM). In a specific application, the transmitter circuit 1104 and the receiver circuit 1103 may be coupled to the antenna 1105. All components of the user equipment 1100 are coupled together by using the bus system 1109. In addition to a data bus, the bus system 1109 includes a power bus, a control bus, and a status signal bus. However, for clarity of description, various buses are marked as the bus system 1109 in the figure.

The processor 1101 may be an integrated circuit chip and has a signal processing capability. The foregoing processor 1101 may be a general purpose processor, a digital signal processor (DSP), an application-specific integrated circuit (ASIC), a field programmable gate array (FPGA) or another programmable logic device, a discrete gate or a transistor logic device, or a discrete hardware component. All methods, steps, and logical block diagrams disclosed in this embodiment of the present invention may be implemented or performed. The general purpose processor may be a microprocessor or the processor may be any normal processor, or the like. The processor not reads information in the memory 1102, and controls all the components of the user equipment 1100 in combination with hardware of the processor 1101.

The method in FIG. 9 may be implemented in the user equipment 1100 in FIG. 11. To avoid repetition, details are not described.

Specifically, under control of the processor 1101, the user equipment two completes the following operations:

determining a frame structure of a serving cell, where each frame based on the frame structure includes 2k subframes, the 2k subframes include at least (N−1) downlink subframes, at least (N−1) uplink subframes, and at least one special subframe, the special subframe is a first special subframe or a second special subframe, N is a positive integer greater than or equal to 1, and k is a positive integer greater than 1; and sending and receiving, based on the frame structure, information in the serving cell; where each frame includes N downlink subframes, N uplink subframes, and (2k−2N) special subframes, and N is less than k; or each frame includes N downlink subframes, (N−1) uplink subframes, and one second special subframe, and N is equal to k; or each frame includes (N−1) downlink subframes, N uplink subframes, and one first special subframe, and N is equal to k.

In this embodiment of the present invention, a downlink subframe, an uplink subframe, and a special subframe are introduced in a radio frame, and a frame structure of a serving cell is determined. Information is sent and received based on the frame structure, so that an uplink HARQ timing and a downlink HARQ timing remain unchanged and are equal to each other for different uplink-downlink configurations. Therefore, in this embodiment of the present invention, a unified hybrid automatic retransmission timing is used, so that complexity of a HARQ timing is reduced. Specifically, in this embodiment of the present invention, not only a unified HARQ-ACK timing but also a unified HARQ retransmission or scheduling timing can be ensured.

In addition, in this embodiment of the present invention, the downlink subframe, the uplink subframe, and the special subframe are introduced, so that not each subframe in a frame includes a GP. In this way, not only one hybrid automatic retransmission timing is used but also overheads of a CP and a GP are reduced.

Optionally, in another embodiment, the special subframe may include a time domain symbol used for downlink transmission, a guard period GP, and a time domain symbol used for uplink transmission; in the first special subframe, a quantity of time domain symbols used for downlink transmission is greater than a quantity of time domain symbols used for uplink transmission; and in the second special subframe, a quantity of time domain symbols used for downlink transmission is less than a quantity of time domain symbols used for uplink transmission.

Optionally, in another embodiment, the frame structure in this embodiment of the present invention may meet the following feature: If a subframe l is a downlink subframe, a subframe (l+k) is an uplink subframe or a second special subframe, and l is an integer; or if a subframe l is an uplink subframe, a subframe (l+k) is a downlink subframe or a first special subframe, and l is an integer.

Optionally, in another embodiment, the receiver circuit 1103 may receive, in the serving cell in a subframe (n−k), physical downlink shared channel transmission or a downlink control channel indicating downlink semi-persistent scheduling release, where n is an integer; and the transmitter circuit 1104 may send, in a subframe n, a hybrid automatic repeat request-acknowledgment HARQ-ACK response corresponding to the physical downlink shared channel transmission or the downlink control channel in the serving cell in the subframe (n−k). In all embodiments of the present invention, sending the corresponding hybrid automatic repeat request-acknowledgment HARQ-ACK response in the serving cell in the subframe (n−k) may be: sending the HARQ-ACK response of the physical downlink shared channel transmission or the downlink control channel indicating the downlink semi-persistent scheduling release, where the physical downlink shared channel transmission or the downlink control channel is received in the serving cell in the subframe (n−k). Therefore, the transmitter circuit 1104 may also send, in a subframe n, the HARQ-ACK response of the physical downlink shared channel transmission or the downlink control channel indicating the downlink semi-persistent scheduling release, where the physical downlink shared channel transmission or the downlink control channel is received by the receiver circuit 1103.

Optionally, in another embodiment, the receiver circuit 1103 may receive, in a subframe i, a downlink control channel that schedules a physical uplink shared channel; and the transmitter circuit 1104 may send, in the serving cell in a subframe (i+k), the physical uplink shared channel that is scheduled by the downlink control channel received by the receiver circuit 1103, where i is an integer.

Optionally, in another embodiment, the transmitter circuit 1104 may send a physical uplink shared channel in the serving cell in a subframe j; and the receiver circuit 1103 may receive, in a subframe (j+k), a HARQ-ACK that is corresponding to the physical uplink shared channel sent by the transmitter circuit 1104, where j is an integer.

Optionally, in another embodiment, the receiver circuit 1103 may receive, in a subframe m, a HARQ-ACK corresponding to a physical uplink shared channel; and the transmitter circuit 1104 may send, in the serving cell in a subframe (m+k), the physical uplink shared channel that is corresponding to the HARQ-ACK received by the receiver circuit 1103, where m is an integer.

Optionally, in another embodiment, a time domain symbol that is used for uplink transmission and that is in the first special subframe is used to transmit a physical uplink control channel and/or a sounding reference signal SRS.

Optionally, in another embodiment, a time domain symbol that is used for downlink transmission and that is in the second special subframe is used to transmit a physical downlink control channel and/or a downlink reference signal. The downlink reference signal herein may be a cell-specific reference signal (Cell-specific reference signal, CRS).

Optionally, in another embodiment, each subframe in the 2k subframes is a subframe of 0.2 ms or a subframe of 0.25 ms. That is, a length of each subframe in the 2k subframes may be 0.2 ms or 0.25 ms.

Optionally, in another embodiment, the processor 1101 may determine the frame structure of the serving cell according to an uplink-downlink configuration of the serving cell, where if the uplink-downlink configuration defines that, in the frame structure, a quantity of subframes used for transmitting the physical uplink shared channel is greater than a quantity of subframes used for transmitting the physical downlink shared channel, the (2k−2N) special subframes are (2k−2N) second special subframes; or if the uplink-downlink configuration defines that, in the frame structure, a quantity of subframes used for transmitting the physical uplink shared channel is less than a quantity of subframes used for transmitting the physical downlink shared channel, the (2k−2N) special subframes are (2k−2N) first special subframes.

In this embodiment of the present invention, a downlink subframe, an uplink subframe, and a special subframe are introduced in a radio frame, and a frame structure of a serving cell is determined. Information is sent and received based on the frame structure, so that an uplink HARQ timing and a downlink HARQ timing remain unchanged and are equal to each other for different uplink-downlink configurations. Therefore, in this embodiment of the present invention, a unified hybrid automatic retransmission timing is used, so that complexity of a HARQ timing is reduced. Specifically, in this embodiment of the present invention, not only a unified HARQ-ACK timing but also a unified HARQ retransmission or scheduling timing can be ensured.

In addition, in this embodiment of the present invention, the downlink subframe, the uplink subframe, and the special subframe are introduced, so that not each subframe includes a GP. In this way, not only one hybrid automatic retransmission timing is used but also overheads of a CP and a GP are reduced.

Figure 12:
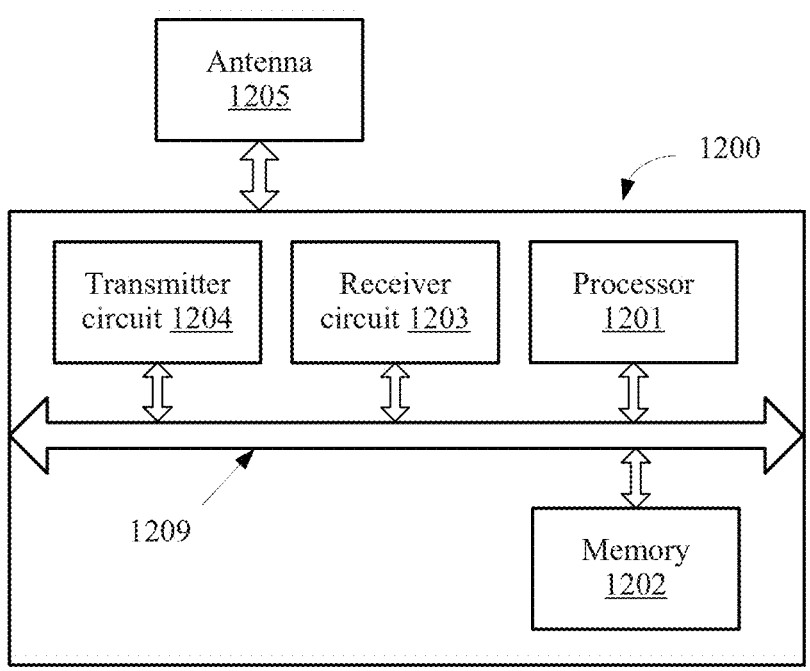
FIG. 12 is a schematic block diagram of a base station according to another embodiment of the present invention.

FIG. 12 is a schematic block diagram of a base station according to another embodiment of the present invention. The base station 1200 in FIG. 12 may be configured to implement all steps and methods in the foregoing method embodiments. A channel resource of a wireless local area network is divided into multiple child resources in a frequency domain. The base station 1200 in FIG. 12 includes a processor 1201, a memory 1202, a receiver circuit 1203, and a transmitter circuit 1204. The processor 1201, the memory 1202, the receiver circuit 1203, and the transmitter circuit 1204 are connected by using a bus system 1209.

In addition, the base station 1200 may include an antenna 1205, and the like. The processor 1201 controls an operation of the base station 1200. The memory 1202 may include a read-only memory and a random access memory, and provides an instruction and data for the processor 1201. A part of the memory 1202 may further include a nonvolatile random access memory (NVRAM). In a specific application, the transmitter circuit 1204 and the receiver circuit 1203 may be coupled to the antenna 1205. All components of the base station 1200 are coupled together by using the bus system 1209. In addition to a data bus, the bus system 1209 includes a power bus, a control bus, and a status signal bus. However, for clarity of description, various buses are marked as the bus system 1209 in the figure.

The processor 1201 may be an integrated circuit chip and has a signal processing capability. The foregoing processor 1201 may be a general purpose processor, a digital signal processor (DSP), an application-specific integrated circuit (ASIC), a field programmable gate array (FPGA) or another programmable logic device, a discrete gate or a transistor logic device, or a discrete hardware component. All methods, steps, and logical block diagrams disclosed in this embodiment of the present invention may be implemented or performed. The general purpose processor may be a microprocessor or the processor may be any normal processor, or the like. The processor 1201 reads information in the memory 1202, and controls all the components of the base station 1200 in combination with hardware of the processor 1101.

The method in FIG. 10 may be implemented in the base station 1200 in FIG. 12. To avoid repetition, details are not described.

Specifically, under control of the processor 1201, the base station 1200 completes the following operations:

determining a frame structure of a serving cell of user equipment, where each frame based on the frame structure includes 2k subframes, the 2k subframes include at least (N−1) downlink subframes, at least (N−1) uplink subframes, and at least one special subframe, the special subframe is a first special subframe or a second special subframe, N is a positive integer greater than or equal to 1, and k is a positive integer greater than 1; and based on the determined frame structure, sending, in the serving cell, information to the user equipment and receiving, in the serving cell, information from the user equipment; where each frame includes N downlink subframes, N uplink subframes, and (2k−2N) special subframes, and N is less than k; or each frame includes N downlink subframes, (N−1) uplink subframes, and one second special subframe, and N is equal to k; or each frame includes (N−1) downlink subframes, N uplink subframes, and one first special subframe, and N is equal to k.

In this embodiment of the present invention, a downlink subframe, an uplink subframe, and a special subframe are introduced in a radio frame, and a frame structure of a serving cell is determined. Information is sent and received based on the frame structure, so that an uplink HARQ timing and a downlink HARQ timing remain unchanged and are equal to each other for different uplink-downlink configurations. Therefore, in this embodiment of the present invention, a unified hybrid automatic retransmission timing is used, so that complexity of a HARQ timing is reduced. Specifically, in this embodiment of the present invention, not only a unified HARQ-ACK timing but also a unified HARQ retransmission or scheduling timing can be ensured.

In addition, in this embodiment of the present invention, the downlink subframe, the uplink subframe, and the special subframe are introduced, so that not each subframe includes a GP. In this way, not only one hybrid automatic retransmission timing is used but also overheads of a CP and a GP are reduced.

Optionally, in another embodiment, the special subframe may include a time domain symbol used for downlink transmission, a guard period GP, and a time domain symbol used for uplink transmission; in the first special subframe, a quantity of time domain symbols used for downlink transmission is greater than a quantity of time domain symbols used for uplink transmission; and in the second special subframe, a quantity of time domain symbols used for downlink transmission is less than a quantity of time domain symbols used for uplink transmission.

Optionally, in another embodiment, the frame structure in this embodiment of the present invention may meet the following feature: If a subframe l is a downlink subframe, a subframe (l+k) is an uplink subframe or a second special subframe, and l is an integer; or if a subframe l is an uplink subframe, a subframe (l+k) is a downlink subframe or a first special subframe, and l is an integer.

Optionally, in another embodiment, the transmitter circuit 1204 may send, in the serving cell to the user equipment in a subframe (n−k), physical downlink shared channel transmission or a downlink control channel indicating downlink semi-persistent scheduling release, where n is an integer; and the receiver circuit 1203 may receive, in a subframe n, a hybrid automatic repeat request-acknowledgment HARQ-ACK response that is fed back by the user equipment and that is corresponding to the physical downlink shared channel transmission or the downlink control channel in the serving cell in the subframe (n−k). In all embodiments of the present invention, receiving, in a subframe n, the corresponding hybrid automatic repeat request-acknowledgment HARQ-ACK response fed back in the serving cell by the user equipment in the subframe (n−k) may be: receiving, in the subframe n, the hybrid automatic repeat request-acknowledgment HARQ-ACK response that is corresponding to the physical downlink shared channel transmission or the downlink control channel indicating the downlink semi-persistent scheduling release, where the physical downlink shared channel transmission or the downlink control channel is sent in the serving cell by the base station to the user equipment in the subframe (n−k). Therefore, the receiver circuit 1203 may also receive, in the subframe n, the HARQ-ACK response of the physical downlink shared channel transmission or the downlink control channel indicating the downlink semi-persistent scheduling release, where the physical downlink shared channel transmission or the downlink control channel is sent by the transmitter circuit 1204.

Optionally, in another embodiment, the transmitter circuit 1204 may send, to the user equipment in a subframe i, a downlink control channel that schedules a physical uplink shared channel; and the receiver circuit 1203 may receive, in the serving cell in a subframe (i+k), the physical uplink shared channel that is scheduled by the downlink control channel sent by the transmitter circuit 1204 to the user equipment in a subframe i, where i is an integer.

Optionally, in another embodiment, the receiver circuit 1203 may receive, in the serving cell in a subframe j, a physical uplink shared channel sent by the user equipment; and the transmitter circuit 1204 may send, in a subframe (j+k), a HARQ-ACK that is corresponding to the physical uplink shared channel received by the receiver circuit 1203, where j is an integer.

Optionally, in another embodiment, the transmitter circuit 1204 may send, in a subframe m, a HARQ-ACK that is corresponding to a physical uplink shared channel sent by the user equipment; and the receiver circuit 1203 may receive, in the serving cell in a subframe (m+k), retransmission of the physical uplink shared channel sent by the transmitter circuit 1204, where m is an integer.

Optionally, in another embodiment, a time domain symbol that is used for uplink transmission and that is in the first special subframe is used to transmit a physical uplink control channel and/or a sounding reference signal SRS.

Optionally, in another embodiment, a time domain symbol that is used for downlink transmission and that is in the second special subframe is used to transmit a physical downlink control channel and/or a downlink reference signal.

Optionally, in another embodiment, each subframe in the 2k subframes is a subframe of 0.2 ms or a subframe of 0.25 ms.

Optionally, in another embodiment, the processor 1201 may determine the frame structure of the serving cell according to an uplink-downlink configuration of the serving cell, where if the uplink-downlink configuration defines that, in the frame structure, a quantity of subframes used for transmitting the physical uplink shared channel is greater than a quantity of subframes used for transmitting the physical downlink shared channel, the (2k−2N) special subframes are (2k−2N) second special subframes; or if the uplink-downlink configuration defines that, in the frame structure, a quantity of subframes used for transmitting the physical uplink shared channel is less than a quantity of subframes used for transmitting the physical downlink shared channel, the (2k−2N) special subframes are (2k−2N) first special subframes.

In this embodiment of the present invention, a downlink subframe, an uplink subframe, and a special subframe are introduced in a radio frame, and a frame structure of a serving cell is determined. Information is sent and received based on the frame structure, so that an uplink HARQ timing and a downlink HARQ timing remain unchanged and are equal to each other for different uplink-downlink configurations. Therefore, in this embodiment of the present invention, a unified hybrid automatic retransmission timing is used, so that complexity of a HARQ timing is reduced. Specifically, in this embodiment of the present invention, not only a unified HARQ-ACK timing but also a unified HARQ retransmission or scheduling timing can be ensured.

In addition, in this embodiment of the present invention, the downlink subframe, the uplink subframe, and the special subframe are introduced, so that not each subframe includes a GP. In this way, not only one hybrid automatic retransmission timing is used but also overheads of a CP and a GP are reduced.

It should be understood that "one embodiment" or "an embodiment" mentioned in the entire specification means that specific features, structures, or characteristics related to the embodiments are included in at least one embodiment of the present invention. Therefore, "in one embodiment" or "in an embodiment" occurred in the specification may not be a same embodiment. In addition, these specific features, structures, or characteristics may be combined in one or more embodiments in any appropriate manner. Sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In conclusion, what is described above is merely examples of embodiments of the technical solutions of the present invention, but is not intended to limit the protection scope of the present invention. Any modification, equivalent replacement, or improvement made without departing from the principle of the present invention shall fall within the protection scope of the present invention.

What is claimed is:

1. An apparatus, comprising:
a processor; and
a non-transitory computer-readable storage medium storing a program to be executed by the processor, the program including instructions to:
determine a frame structure of a serving cell selected from a plurality of predefined frame structures, wherein each frame structure of the plurality of frame structures has an arrangement of special subframes in the respective frame structure that is different from an arrangement of special subframes in each other frame structure of the plurality of frame structures, wherein the arrangement of the special subframes on each frame structure of the plurality of frame structures is a location of each of the special subframes with respect to uplink and downlink subframes of the respective frame structure, wherein each frame structure of the plurality of frame structures has a unified hybrid automatic repeat request (HARQ) acknowledgement (ACK) timing with a same HARQ ACK timing and a same uplink HARQ timing and downlink HARQ timing, and wherein each frame structure of the plurality of frame structures has further has a unified HARQ retransmission or scheduling timing with a same HARQ retransmission or scheduling timing, wherein each frame based on the frame structure comprises 2k subframes, the 2k subframes comprise at least (N−1) downlink subframes, at least (N−1) uplink subframes, and at least one special subframe, wherein the at least one special subframe is a first special subframe or a second special subframe, N is a positive integer greater than or equal to 1, and k is a positive integer greater than 1, and wherein at least one first subframe of the 2k subframes is free of a guard period, and wherein at least one second subframe of the 2k subframes comprises a guard period; and
send and receive information in the serving cell in one or more frames based on the frame structure;
wherein each frame of the one or more frames comprises N downlink subframes, N uplink subframes, and (2k−2N) special subframes, where N is less than k, or each frame comprises N downlink subframes, (N−1) uplink subframes, and one second special subframe, where N is equal to k, or each frame comprises (N−1) downlink subframes, N uplink subframes, and one first special subframe, where N is equal to k.

2. The apparatus according to claim 1, wherein the at least special subframe comprises a first time domain symbol for downlink transmission, a guard period (GP), and a second time domain symbol for uplink transmission;
wherein, in the first special subframe, a quantity of first time domain symbols for downlink transmission is greater than a quantity of second time domain symbols for uplink transmission; and
wherein, in the second special subframe, the quantity of the first time domain symbols for downlink transmission is less than the quantity of second time domain symbols for uplink transmission.

3. The apparatus according to claim 1, wherein, in the frame structure, a subframe l is the downlink subframe, a subframe (l+k) is the uplink subframe or the second special subframe, and l is an integer, or the subframe l is the uplink subframe, the subframe (l+k) is the downlink subframe or the first special subframe, and l is an integer.

4. The apparatus according to claim 1, wherein instructions to send and receive the information in the serving cell includes instructions to:
receive, in the serving cell in a subframe (n−k), a physical downlink shared channel transmission or a downlink control channel indicating downlink semi-persistent scheduling release, wherein n is an integer; and
send, in a subframe n, a hybrid automatic repeat request-acknowledgment (HARQ-ACK) response corresponding to the physical downlink shared channel transmission or to the downlink control channel in the serving cell in the subframe (n−k).

5. The apparatus according to claim 1, wherein instructions to send and receive the information in the serving cell includes instructions to:
receive, in a subframe (i), a downlink control channel that schedules a physical uplink shared channel; and
send, in the serving cell in a subframe (i+k), the physical uplink shared channel scheduled by the downlink control channel, wherein i is an integer.

6. The apparatus according to claim 1, wherein instructions to send and receive the information in the serving cell includes instructions to:
send a physical uplink shared channel in the serving cell in a subframe (j); and
receive, in a subframe (j+k), a hybrid automatic repeat request-acknowledgment (HARQ-ACK) response corresponding to the physical uplink shared channel, wherein j is an integer.

7. The apparatus according to claim 1, wherein instructions to send and receive the information in the serving cell includes instructions to:
receive, in a subframe (m), a hybrid automatic repeat request-acknowledgment (HARQ-ACK) response corresponding to a physical uplink shared channel; and
send, in the serving cell in a subframe (m+k), the physical uplink shared channel corresponding to the HARQ-ACK response, wherein m is an integer.

8. The apparatus according to claim 1, wherein a time domain symbol that is used for uplink transmission and that is in the first special subframe is used to transmit a physical uplink control channel or a sounding reference signal (SRS).

9. The apparatus according to claim 1, wherein a time domain symbol that is for downlink transmission and that is in the second special subframe is used to transmit a physical downlink control channel or a downlink reference signal.

10. The apparatus according to claim 1, wherein each subframe in the 2k subframes is a subframe having a duration of 0.2 ms or 0.25 ms.

11. An information transmission method, comprising:
determining, by a base station, a frame structure of a serving cell of user equipment wherein the frame structure is selected from a plurality of predefined frame structures, wherein each frame structure of the plurality of frame structures has an arrangement of special subframes in the respective frame structure that is different from an arrangement of special subframes in each other frame structure of the plurality of frame structures, wherein the arrangement of the special subframes on each frame structure of the plurality of frame structures is a location of each of the special subframes with respect to uplink and downlink subframes of the respective frame structure, wherein each frame structure of the plurality of frame structures has a unified hybrid automatic repeat request (HARQ) acknowledgement (ACK) timing with a same HARQ ACK timing and a same uplink HARQ timing and downlink HARQ timing, and wherein each frame structure of the plurality of frame structures has further has a unified HARQ retransmission or scheduling timing with a same HARQ retransmission or scheduling timing, wherein each frame based on the frame structure comprises 2k subframes, wherein the 2k subframes comprise at least (N−1) downlink subframes, at least (N−1) uplink subframes, and at least one special subframe, wherein the at least one special subframe is a first special subframe or a second special subframe, wherein N is a positive integer greater than or equal to 1, and wherein k is a positive integer greater than 1, and wherein at least one first subframe of the 2k subframes is free of a guard period, and wherein at least one second subframe of the 2k subframes comprises a guard period; and sending, in the serving cell, by the base station and based on the frame structure, information to the user equipment, and receiving, in the serving cell by the base station, information from the user equipment, wherein the information sent to the user equipment and the information received from the user equipment comprise one or more frames according to the frame structure;

wherein each frame of the one or more frames comprises N downlink subframes, N uplink subframes, and (2k−2N) special subframes, and N is less than k; or each frame of the one or more frames comprises N downlink subframes, (N−1) uplink subframes, and one second special subframe, and N is equal to k; or each frame comprises (N−1) downlink subframes, N uplink subframes, and one first special subframe, and N is equal to k.

12. The method according to claim 11, wherein the at least one special subframe comprises a time domain symbol used for downlink transmission, a guard period (GP), and a time domain symbol used for uplink transmission;

wherein, in the first special subframe, a quantity of time domain symbols used for downlink transmission is greater than a quantity of time domain symbols used for uplink transmission; and wherein in the second special subframe, the quantity of time domain symbols used for downlink transmission is less than the quantity of time domain symbols used for uplink transmission.

13. The method according to claim 11, wherein, in the frame structure, if a subframe (l) is the downlink subframe, a subframe (l+k) is the uplink subframe or the second special subframe, and l is an integer, or, if a subframe (l) is the uplink subframe, a subframe (l+k) is the downlink subframe or the first special subframe, and l is an integer.

14. The method according to claim 11, wherein the sending the information to the user equipment and receiving the information from the user equipment comprises:

sending, in the serving cell by the base station to the user equipment in a subframe (n−k), physical downlink shared channel transmission or a downlink control channel indicating downlink semi-persistent scheduling release, wherein n is an integer; and receiving, by the base station in a subframe (n), a hybrid automatic repeat request-acknowledgment (HARQ-ACK) response that is fed back by the user equipment and that is corresponding to the physical downlink shared channel transmission or the downlink control channel in the serving cell in the subframe (n−k).

15. The method according to claim 11, wherein the sending the information to the user equipment and receiving the information from the user equipment comprises:

sending, by the base station to the user equipment in a subframe (i), a downlink control channel that schedules a physical uplink shared channel; and receiving, in the serving cell by the base station in a subframe (i+k), the physical uplink shared channel scheduled by the downlink control channel, wherein i is an integer.

16. The method according to claim 11, wherein the sending the information to the user equipment and receiving the information from the user equipment comprises:

receiving, in the serving cell by the base station in a subframe (j), a physical uplink shared channel sent by the user equipment; and sending, by the base station in a subframe (j+k), a hybrid automatic repeat request-acknowledgment (HARQ-ACK) response corresponding to the physical uplink shared channel, wherein j is an integer.

17. The method according to claim 11, wherein the sending the information to the user equipment and receiving the information from the user equipment comprises:

sending, by the base station in a subframe (m), a hybrid automatic repeat request-acknowledgment (HARQ-ACK) response corresponding to a physical uplink shared channel sent by the user equipment; and receiving, by the base station, retransmission of the physical uplink shared channel in the serving cell in a subframe (m+k), wherein m is an integer.

18. The method according to claim 11, wherein a time domain symbol that is used for uplink transmission and that is in the first special subframe is used to transmit a physical uplink control channel and/or a sounding reference signal (SRS).

19. A method, comprising:

determining a frame structure of a serving cell of a user equipment, wherein the frame structure is selected from a plurality of predefined frame structures, wherein each frame structure of the plurality of frame structures has an arrangement of special subframes in the respective frame structure that is different from an arrangement of special subframes in each other frame structure of the plurality of frame structures, wherein the arrangement of the special subframes on each frame structure of the plurality of frame structures is a location of each of the special subframes with respect to uplink and downlink subframes of the respective frame structure, wherein each frame structure of the plurality of frame structures has a unified hybrid automatic repeat request (HARQ) acknowledgement (ACK) timing with a same HARQ ACK timing and a same uplink HARQ timing and downlink HARQ timing, and wherein each frame structure of the plurality of frame structures has further has a unified HARQ retransmission or scheduling timing with a same HARQ retransmission or scheduling timing, wherein each frame based on the frame structure comprises 2k subframes, the 2k subframes comprise at least (N−1) downlink subframes, at least (N−1) uplink subframes, and at least one special subframe, wherein the at least one special subframe is a first special subframe or a second special subframe, N is a positive integer greater than or equal to 1, and k is a positive integer greater than 1, and wherein at least one first subframe of the 2k subframes is free of a guard period, and wherein at least one second subframe of the 2k subframes comprises a guard period; and sending and receiving information in the serving cell in one or more frames based on the frame structure;

wherein each frame of the one or more frames comprises N downlink subframes, N uplink subframes, and (2k-2N) special subframes, where N is less than k, or each frame comprises N downlink subframes, (N−1) uplink subframes, and one second special subframe, where N is equal to k, or each frame comprises (N−1) downlink subframes, N uplink subframes, and one first special subframe, where N is equal to k.

20. An apparatus, comprising:

a processor; and a non-transitory computer-readable storage medium storing a program to be executed by the processor, the program including instructions to:

determine a frame structure of a serving cell of a user equipment, wherein the frame structure is selected from a plurality of predefined frame structures, wherein each frame structure of the plurality of frame structures has an arrangement of special subframes in the respective frame structure that is different from an arrangement of special subframes in each other frame structure of the plurality of frame structures, wherein the arrangement of the special subframes on each frame structure of the plurality of frame structures is a location of each of the special subframes with respect to uplink and downlink subframes of the respective frame structure, wherein each frame structure of the plurality of frame structures has a unified hybrid automatic repeat request (HARQ) acknowledgement (ACK) timing with a same HARQ ACK timing and a same uplink HARQ timing and downlink HARQ timing, and wherein each frame structure of the plurality of frame structures has further has a unified HARQ retransmission or scheduling timing with a same HARQ retransmission or scheduling timing, wherein each frame based on the frame structure comprises 2k subframes, wherein the 2k subframes comprise at least (N−1) downlink subframes, at least (N−1) uplink subframes, and at least one special subframe, wherein the at least one special subframe is a first special subframe or a second special subframe, wherein N is a positive integer greater than or equal to 1, and wherein k is a positive integer greater than 1, and wherein at least one first subframe of the 2k subframes is free of a guard period, and wherein at least one second subframe of the 2k subframes comprises a guard period; and send, in the serving cell, based on the frame structure, information to the user equipment, and receive, in the serving cell, information from the user equipment, wherein the information sent to the user equipment and the information received from the user equipment comprise one or more frames according to the frame structure;

wherein each frame of the one or more frames comprises N downlink subframes, N uplink subframes, and (2k-2N) special subframes, and N is less than k; or each frame of the one or more frames comprises N downlink subframes, (N−1) uplink subframes, and one second special subframe, and N is equal to k; or each frame comprises (N−1) downlink subframes, N uplink subframes, and one first special subframe, and N is equal to k.

* * * * *